US007773252B2

(12) United States Patent
Yoshida et al.

(10) Patent No.: US 7,773,252 B2
(45) Date of Patent: Aug. 10, 2010

(54) COLORIMETRIC-DATA CORRECTING METHOD

(75) Inventors: Yasunari Yoshida, Ama-gun (JP); Masaki Kondo, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1707 days.

(21) Appl. No.: 10/892,409

(22) Filed: Jul. 16, 2004

(65) Prior Publication Data

US 2005/0057762 A1    Mar. 17, 2005

(30) Foreign Application Priority Data

Sep. 12, 2003   (JP)   ............... 2003-322156

(51) Int. Cl.
G06F 15/00 (2006.01)
G06K 1/00 (2006.01)
H04N 1/60 (2006.01)
G06K 15/00 (2006.01)
H04N 1/40 (2006.01)

(52) U.S. Cl. ..................... 358/1.9; 358/3.23
(58) Field of Classification Search ......... 358/1.9–3.32, 358/500–540
See application file for complete search history.

(56) References Cited

U.S. PATENT DOCUMENTS 7,136,523 B2   11/2006  Fukao et al.
7,142,710 B2   11/2006  Hung
7,196,823 B2 *  3/2007  Hagai et al. ............ 358/3.23
2002/0047848 A1 *  4/2002  Odagiri et al. ........... 345/581
2003/0081831 A1 *  5/2003  Fukao et al. ............ 382/167

FOREIGN PATENT DOCUMENTS

| JP | A 8-275007 | 10/1996 |
| JP | A-11-298746 | 10/1999 |
| JP | B2 3080373 | 6/2000 |
| JP | A-2001-16476 | 1/2001 |
| JP | A 2002-64718 | 2/2002 |
| JP | A-2002-94820 | 3/2002 |
| JP | A 2003-169219 | 6/2003 |
| JP | A-2003-179764 | 6/2003 |
| JP | A-2003-219193 | 7/2003 |

* cited by examiner

*Primary Examiner*—Douglas Q Tran
(74) *Attorney, Agent, or Firm*—Oliff & Berridge, PLC

(57) ABSTRACT

Colorimetric data corresponding to corner grid points in an RGB color space, such as grid point P1, is used without correction. For grid points positioned on an edge, such as grid point P2, an average value is calculated for calorimetric data corresponding to a total of three grid points, including a target grid point and two adjacent grid points on the edge. For grid points positioned on a surface, such as grid point P4, an average value is calculated for calorimetric data corresponding to a total of nine grid points, including the target grid point and eight adjacent grid points on the surface. For grid points positioned inside the cube-shaped grid, such as grid point P5, an average value is calculated for calorimetric data corresponding to a total of 27 grid points, including the target grid point and 26 grid points adjacent to the target grid point three-dimensionally.

28 Claims, 19 Drawing Sheets

CUBE-SHAPED GRID

COLOR PATCH (729 COLORS)

● : COLORIMETRIC DATA CORRESPONDING TO GRID POINTS ON THE RGB GRAY AXIS

COLORIMETRIC-DATA CORRECTING METHOD

BACKGROUND OF THE INVENTION

1. Field of the Invention

The present invention relates to a colorimetric-data correcting method for correcting calorimetric data obtained by measuring color patches printed by a printing device, a conversion-table creating method for creating a conversion table used to convert inputted color image data into printing data based on the calorimetric data that has been corrected according to the colorimetric-data correcting method, and a computer program for implementing these methods.

2. Description of Related Art

Color printers, color copiers, and other color image forming devices convert inputted color image data such as RGB (red, green, and blue) values into printing data such as CMY (cyan, magenta, and yellow) values to be outputted.

A look-up table (LUT) is used to convert the RGB values to the CMY values. Since the LUT is dependent on each device (device-dependent), the LUT is generally created for each device. A method of creating an LUT is disclosed in Japanese patent application publication (kokai) No. HEI-8-275007.

SUMMARY OF THE INVENTION

As shown in FIG. 1, a cube-shaped grid having multiple grid points is defined in an RGB color space, for example, to represent RGB color image data. The cube-shaped grid is obtained by dividing each axis in the RGB color space into (n+1) grid points equidistant to one another, where n is an integer that is greater than or equal to two. Hence, the cube-shaped grid in this example includes $(n+1)^3$ grid points. A created LUT stores CMY values corresponding to the $(n+1)^3$ grid points of the cube-shaped grid.

In some cases it is not possible to create a precise LUT due to problems in the calorimetric data, generating printing results with incorrect color tones. Ideally, when measuring colors corresponding to each of the $(n+1)^3$ grid points in the RGB color space, a set of calorimetric data having progressive color tone at regular intervals should be obtained in an Lab color space.

In reality, however, the obtained calorimetric data may include variations, as shown in FIG. 2, due to the surface of printing paper being not perfectly uniform, horizontal streaks or striped patterns in the printed color patches, variations in the positions of measurement, or irregularities in the calorimeter itself. If the LUT is created based on such irregular calorimetric data, singular points are generated in the LUT data. Hence, if RGB-to-CMY conversion is performed using such an LUT, regions having incorrect gradations may be generated in the printing results.

Conventionally, because modifications were made for each irregular calorimetric data on a pinpoint basis, the creation of an LUT has required considerable time and effort.

In view of the foregoing, it is an object of the present invention to provide a colorimetric-data correcting method and a conversion-table creating method for creating a reliable color conversion table based on corrected calorimetric data by reducing irregularities in the calorimetric data.

In order to attain the above and other objects, the present invention provides a colorimetric-data correcting method. The colorimetric-data correcting method includes printing color patches in colors each corresponding to one of a plurality of coordinate points in an output color space defined for a printing device, measuring each color patch with a calorimeter to obtain calorimetric data for each color patch, the calorimetric data being represented by coordinate data in a device-independent standard color space, and correcting the calorimetric data for each of at least one color patch based on at least three (3) calorimetric data including the calorimetric data to be corrected.

The present invention also provides a colorimetric-data correcting method. The colorimetric-data correcting method includes printing color patches with a printing device for colors each corresponding to one of a plurality of coordinate points in an output color space defined for the printing device, the printing device being capable of receiving color image signals from an input device and of printing color images, measuring each color patch with a calorimeter to obtain calorimetric data for each color patch, the calorimetric data being represented by coordinate data in a device-independent standard color space, and correcting the calorimetric data for each of at least one color patch based on at least three (3) calorimetric data including the calorimetric data to be corrected, thereby obtaining a first correlation that specifies relationships between the corrected calorimetric data in the device-independent standard color space and coordinate data in the output color space, in order to create a color-conversion table for storing combination of a plurality of coordinate points in an input color space defined for the input device and a plurality of coordinate points in the output color space, based on both the first correlation and a second correlation, the second correlation specifying predetermined relationships between the corrected calorimetric data in the device-independent standard color space and coordinate data in the input color space, each coordinate point in the input color space corresponding to one color of the color image signals that will possibly be sent from the input device to the printing device.

The present invention also provides a conversion-table creating method. The conversion-table creating method includes printing color patches with a printing device for colors each corresponding to one of a plurality of coordinate points in an output color space defined for the printing device, the printing device being capable of receiving color image signals from an input device and of printing color images, measuring each color patch with a calorimeter to obtain calorimetric data for each color patch, the calorimetric data being represented by coordinate data in a device-independent standard color space, correcting the calorimetric data for each of at least one color patch based on at least three (3) calorimetric data including the calorimetric data to be corrected, thereby obtaining a first correlation that specifies relationships between the corrected calorimetric data in the device-independent standard color space and coordinate data in the output color space, and creating a color-conversion table for storing combination of a plurality of coordinate points in an input color space defined for the input device and a plurality of coordinate points in the output color space, based on both the first correlation and a second correlation, the second correlation specifying predetermined relationships between the corrected calorimetric data in the device-independent standard color space and coordinate data in the input color space, each coordinate point in the input color space corresponding to one color of the color image signals that will possibly be sent from the input device to the printing device.

The present invention also provides a storage medium for storing a colorimetric-data correcting program. The storage medium includes the programs of printing color patches in colors each corresponding to one of a plurality of coordinate points in an output color space defined for a printing device, measuring each color patch with a calorimeter to obtain colorimetric data for each color patch, the calorimetric data being represented by coordinate data in a device-independent standard color space, and correcting the colorimetric data for each of at least one color patch based on at least three (3) calorimetric data including the colorimetric data to be corrected.

The present invention also provides a storage medium for storing a conversion-table creating program. The storage medium includes the programs of printing color patches with a printing device for colors each corresponding to one of a plurality of coordinate points in an output color space defined for the printing device, the printing device being capable of receiving color image signals from an input device and of printing color images, measuring each color patch with a calorimeter to obtain calorimetric data for each color patch, the calorimetric data being represented by coordinate data in a device-independent standard color space, correcting the calorimetric data for each of at least one color patch based on at least three (3) colorimetric data including the calorimetric data to be corrected, thereby obtaining a first correlation that specifies relationships between the corrected calorimetric data in the device-independent standard color space and coordinate data in the output color space, and creating a color-conversion table for storing combination of a plurality of coordinate points in an input color space defined for the input device and a plurality of coordinate points in the output color space, based on both the first correlation and a second correlation, the second correlation specifying predetermined relationships between the corrected calorimetric data in the device-independent standard color space and coordinate data in the input color space, each coordinate point in the input color space corresponding to one color of the color image signals that will possibly be sent from the input device to the printing device.

BRIEF DESCRIPTION OF THE DRAWINGS

The above and other objects, features and advantages of the invention will become more apparent from reading the following description of the present embodiments taken in connection with the accompanying drawings in which.

DETAILED DESCRIPTION OF THE PREFERRED EMBODIMENTS

A colorimetric-data correcting method, a conversion-table creating method, and a storage medium according to preferred embodiments of the present invention will be described while referring to the accompanying drawings.

Figure 1:
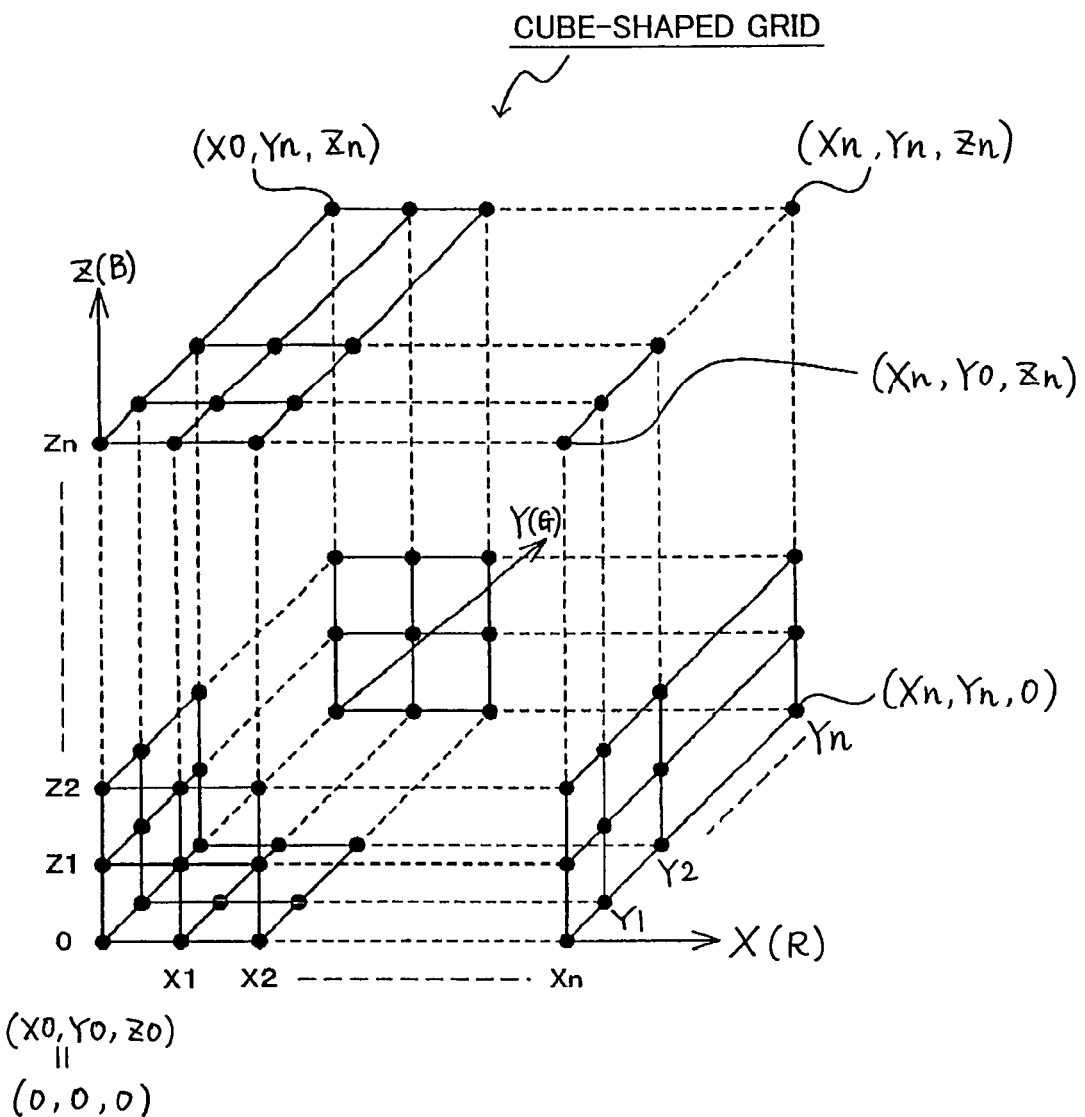
FIG. 1 is an explanatory diagram showing an example of a cube-shaped grid.
Figure 2:
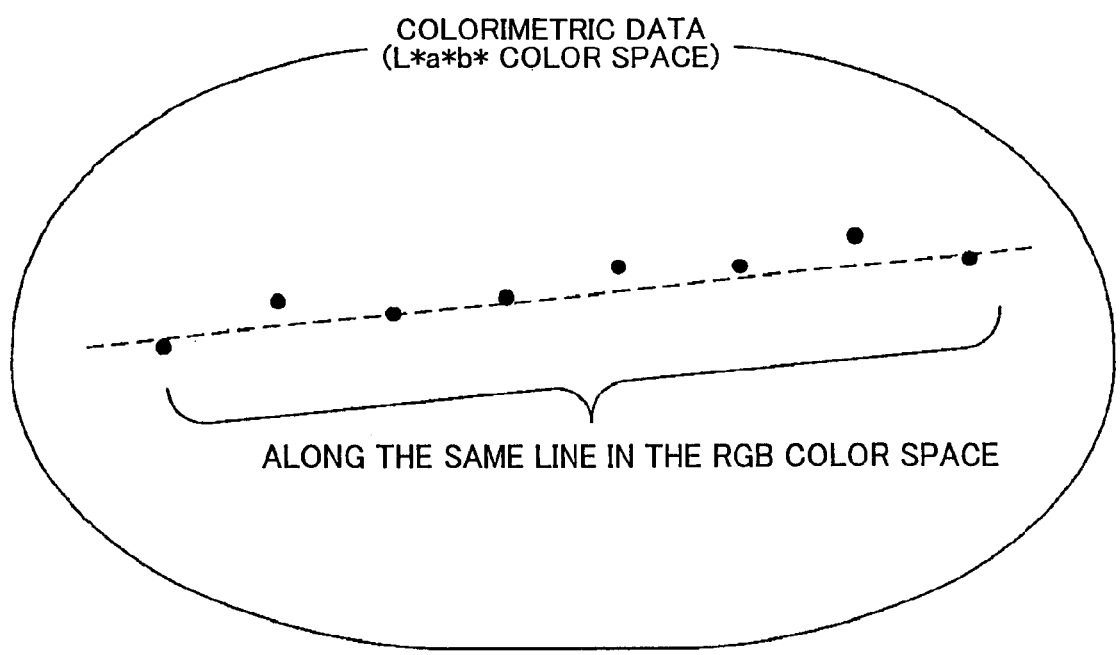
FIG. 2 is an explanatory diagram illustrating irregularities in calorimetric data.
Figure 3:
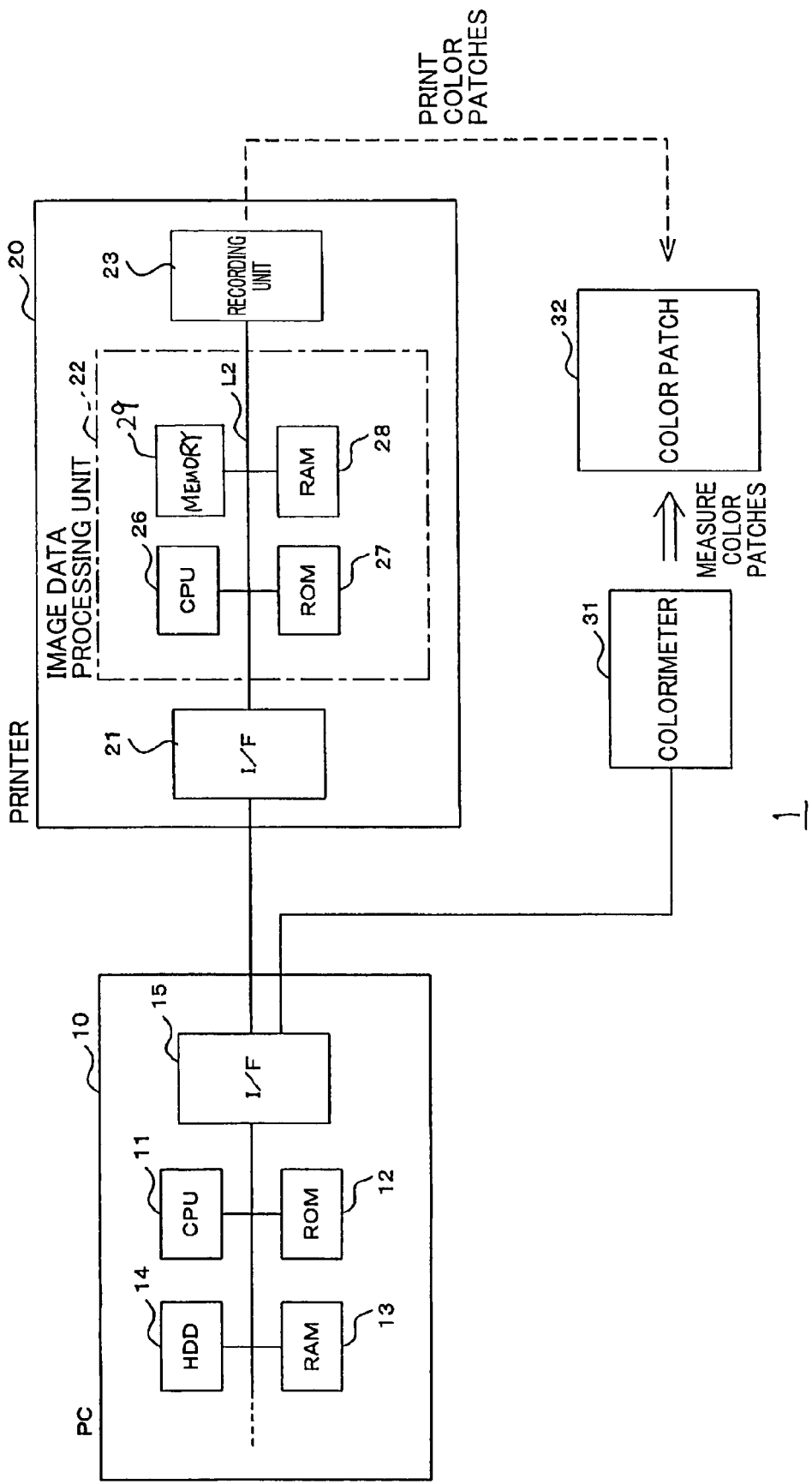
FIG. 3 is a block diagram showing the construction of a colorimetric-data correction system according to an embodiment of the present invention.

FIG. 3 is a block diagram showing the construction of a colorimetric-data correction system 1 according to the present embodiment. As shown in FIG. 3, the colorimetric-data correction system 1 includes a personal computer 10, a printer 20, and a calorimeter 31.

The personal computer 10 has a common construction that includes a CPU 11, a ROM 12, a RAM 13, a hard disk drive (HDD) 14, and an input/output interface 15. In the present embodiment, the HDD 14 stores a calorimetric data correction program and an LUT creation program. The CPU 11 performs processes based on these programs when required.

The printer 20 includes an input/output interface 21, an image data processing unit 22, and a recording unit 23. The input/output interface 21 inputs print data such as color image data, from the personal computer 10, an LUT created by the personal computer 10, and the like. The image data processing unit 22 converts inputted print data to dot pattern data for printing or recording. The recording unit 23 records images on paper based on the dot pattern data received from the image data processing unit 22. The image data processing unit 22 includes a CPU 26, a ROM 27, a RAM 28, and a memory 29, all of which are connected to one another by a bus line L2. The memory 29 is an erasable and programmable ROM such as an EEPROM (Electronically Erasable and Programmable Read Only Memory) in this embodiment. The memory 29 is used for storing a look-up table (LUT) 41. The primary function of the image data processing unit 22 is to convert inputted RGB values to dot pattern data.

Figure 4:
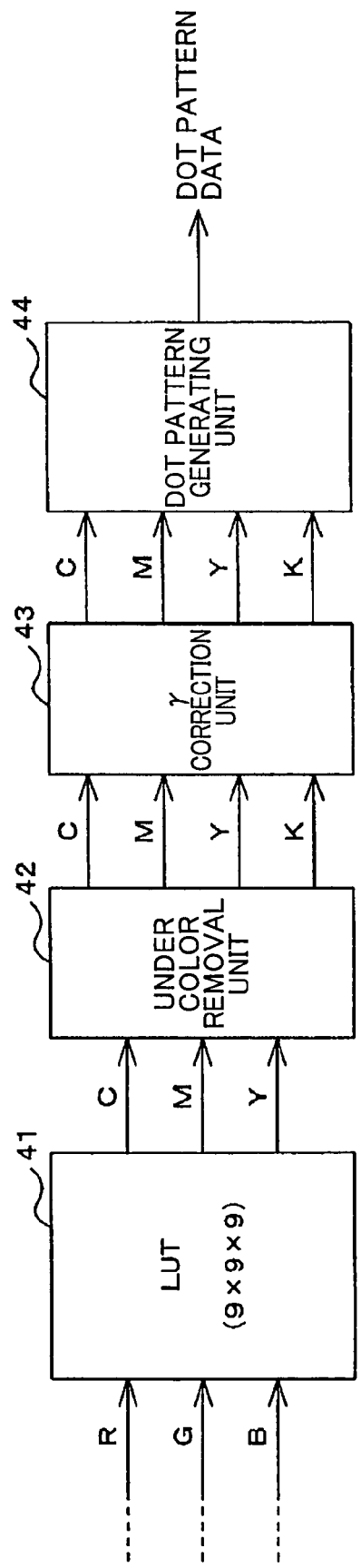
FIG. 4 is an explanatory diagram showing the process of converting RGB values to dot pattern data.

The method used for converting the RGB data to dot pattern data will be described with reference to FIG. 4. As shown in FIG. 4, red (R), green (G), and blue (B) data are inputted as input signals for a color image. The LUT 41 converts the RGB data to cyan (C), magenta (M), and yellow (Y) data, which are complementary color components. Then, an under color removal unit 42 performs under color removal to convert the CMY values to four color components C, M, Y, and black (K). Next, a γ (gamma) correction unit 43 performs a γ (gamma) correction, and subsequently a dot pattern generating unit 44 converts the corrected data to dot pattern data.

An LUT creation process for creating the LUT 41 will be described with reference to a flowchart of FIG. 5. In the present embodiment, the personal computer 10 (FIG. 3) creates the LUT 41 that is used by the printer 20. The CPU 11 of the personal computer 10 reads the LUT creation program from the HDD 14 and executes the process according to the LUT creation program.

Figure 6:
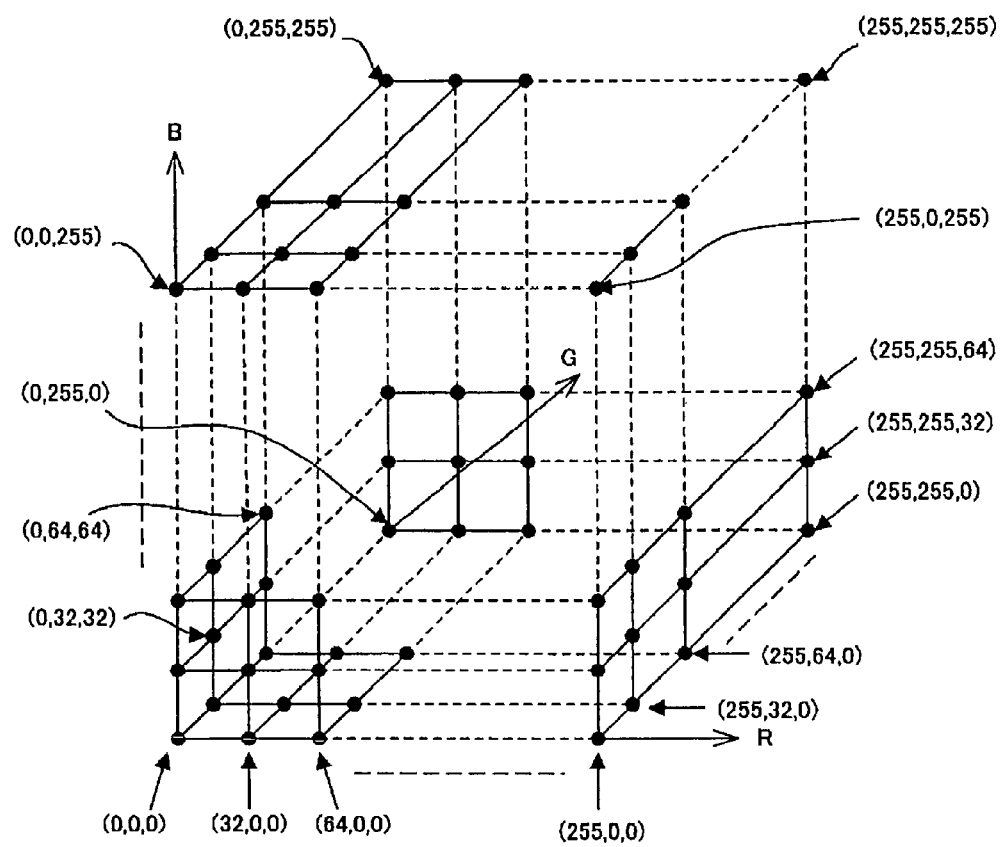
FIG. 6 is an explanatory diagram showing a cube-shaped grid having 729 grid points in an RGB color space.

At the beginning of the process in step S110 (Step is hereinafter abbreviated as "S"), the CPU 11 issues a command to the printer 20 to print color patches. Specifically, as shown in FIG. 6, a cube-shaped grid having 729 grid points is defined in an RGB color space. The cube-shaped grid is obtained by dividing each axis in the RGB color space into 9 grid points equidistant to one another. Hence, the cube-shaped grid includes 9×9×9=729 grid points in the present embodiment.

Figure 7:
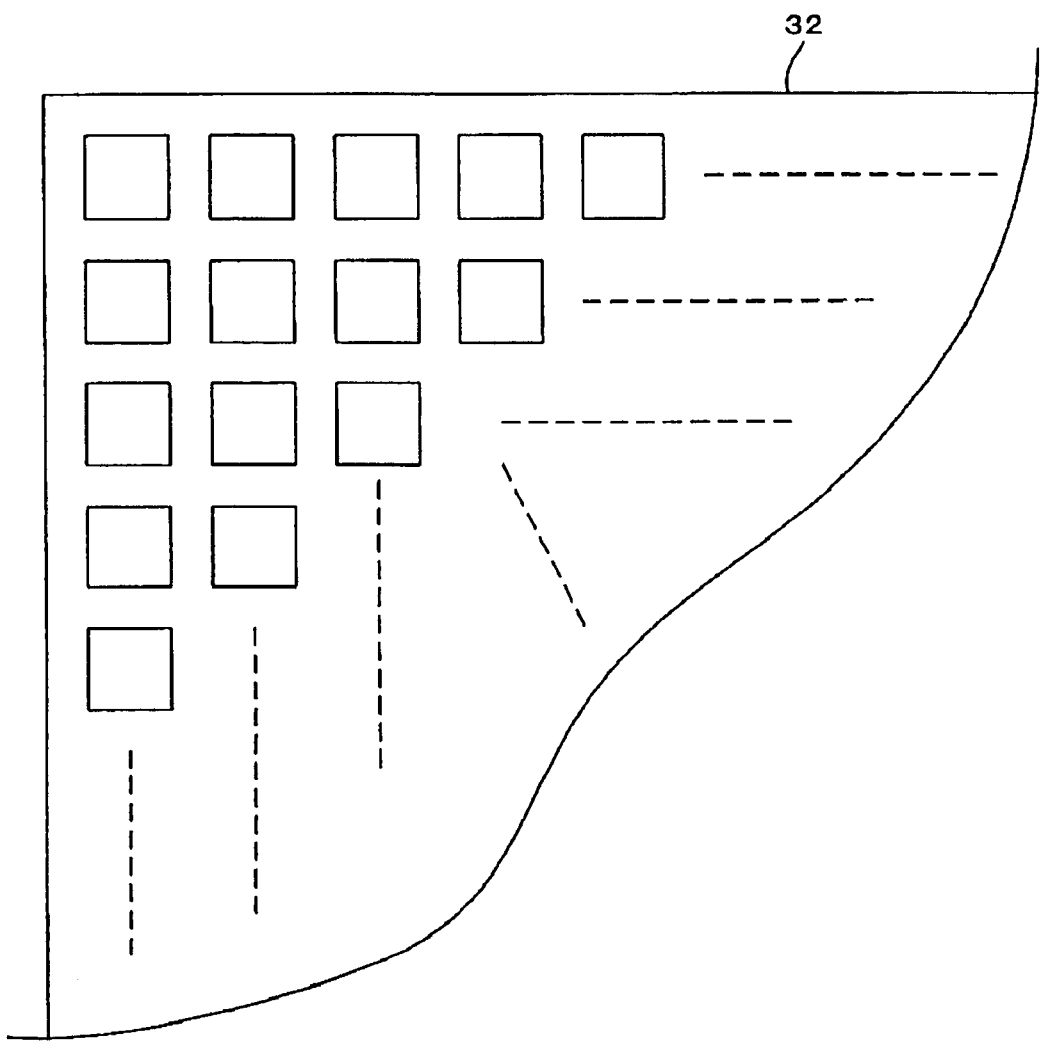
FIG. 7 is an explanatory diagram showing color patches corresponding to the 729 grid points of the cube-shaped grid of FIG. 6.

The CPU 11 outputs RGB values to the printer 20 so that the printer 20 records on paper colors corresponding to the 729 grid points in the RGB color space shown in FIG. 6. Upon receiving the command including the RGB values, the printer 20 prints a color patch 32 with reference to equations C=255−R, M=255−G, and Y=255−B (without referencing the LUT 41). A portion of the color patch 32 is shown in FIG. 7. The color patch 32 includes 729 color patches, each of which corresponds to each of the 729 grid points of the cube-shaped grid.

Figure 5:
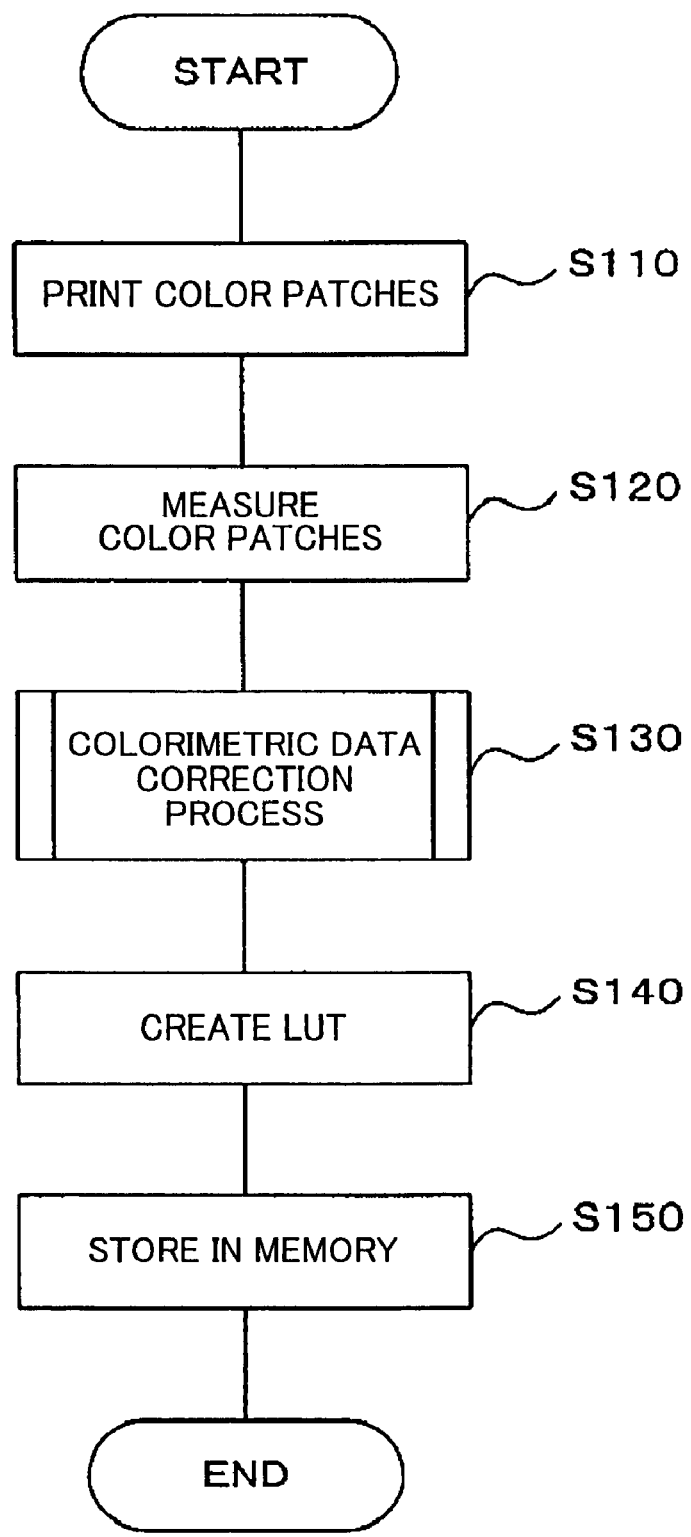
FIG. 5 is a flowchart showing the steps in an LUT creation process according to the embodiment.

In S120 of FIG. 5, the color patch 32 is measured. Specifically, the calorimeter 31 is used to measure each patch of the 729 colors printed in the color patch 32. Then, the personal computer 10 obtains the resulting calorimetric data from the calorimeter 31. In the present embodiment, the calorimetric data is values defined in an L*a*b* color space (hereinafter referred to as "Lab values"). The Lab color space is device-independent color space that is well known in the art. In S130, the CPU 11 performs a colorimetric-data correction process. The colorimetric-data correction process will be described in greater detail later.

By performing the colorimetric-data correction process of S130, the CPU 11 obtains corrected calorimetric data with a reduced amount of irregularity or variation. In S140, the CPU 11 creates the LUT 41 based on the corrected calorimetric data. In other words, the CPU 11 obtains a correspondence between the RGB values and the CMY values from both a correspondence between the RGB values and the Lab values and a correspondence between the Lab values and the CMY values, as will be described in more detail later. Then, the CPU 11 sets the obtained RGB-CMY correspondence as the LUT 41. More specifically, the LUT 41 includes the CMY values corresponding to the 729 grid points in the cube-shaped grid shown in FIG. 6.

In S150, the CPU 11 outputs the LUT 41 to the printer 20 to be stored in the memory 29. Once the LUT 41 is set in the printer 20 in S150, the LUT 41 can be used to convert inputted RGB values to CMY values.

A method to obtain the correspondence between the RGB values and the CMY values, which is used in S140, will be described. A correspondence between the RGB values and the Lab values is obtained from equations (11) through (19) as shown below. First, the RGB values can be converted to XYZ values, based on equations (11) through (16).

$$SR=(R/255)^{\gamma r} \quad (11)$$

$$SG=(G/255)^{\gamma g} \quad (12)$$

$$SB=(B/255)^{\gamma b} \quad (13)$$

$$X=SR*Xr+SG*Xg+SB*Xb \quad (14)$$

$$Y=SR*Yr+SG*Yg+SB*Yb \quad (15)$$

$$Z=SR*Zr+SG*Zg+SB*Zb \quad (16)$$

In these equation, a symbol * represents multiplication. Values R, G, and B are pixel values for the R, G, and B colors, respectively. Values X, Y, and Z are values for each component in the XYZ color space. Values γr, γg, and γb are gamma (γ) values for each component of the RGB colors. Values SR, SG, and SB are pixel values after gamma correction for each component of the RGB colors. Values Xr, Yr, and Zr are XYZ values for the R (red) color. Values Xg, Yg, and Zg are XYZ values for the G (green) color. Values Xb, Yb, and Zb are XYZ values for the B (blue) color. Out of these values, the gamma values (γr, γg, and γb) and the XYZ values (Xr, Yr, Zr, Xg, Yg, Zg, Xb, Yb, and Zb) are stored in the ROM 27 of the printer 20 as profile data. The profile data represents color conversion characteristics between devices.

Next, the XYZ values can be converted to Lab values, based on equations (17) through (19).

$$L=(Y/Yn)^{1/3}*116-16 \quad (17)$$

$$a=500*((X/Xn)^{1/3}-(Y/Yn)^{1/3}) \quad (18)$$

$$b=200*((Y/Yn)^{1/3}-(Z/Zn)^{1/3}) \quad (19)$$

Values Xn, Yn, and Zn are the X, Y, and Z values of standard white color and are defined in the profile data. Values L, a, and b are values for each component of the Lab color space.

From the above equations (11) through (19), the correspondence between the RGB values and the Lab values is known. In addition, because the Lab values corresponding to the CMY values for each color patch can be obtained through measurement, the correspondence between the Lab values and the CMY values is known. Accordingly, the correspondence between the RGB values and the CMY values can be obtained from both the correspondence between the RGB values and the Lab values and the correspondence between the Lab values and the CMY values.

Next, the colorimetric-data correction process of S130 will be described with reference to FIG. 8. In the present embodiment, the CPU 11 corrects calorimetric data corresponding to each RGB grid point (FIG. 6), by performing an average value calculation on calorimetric data corresponding to a grid point targeted for correction (hereinafter referred to as a target grid point) and calorimetric data corresponding to grid points adjacent to the target grid point (hereinafter referred to as adjacent grid points).

In this correction process, different methods are used to calculate the average value for each of the 729 grid points depending on the position of the target grid point. Methods for calculating average values will be described with reference to FIGS. 9(a) and 9(b). In the present embodiment, different methods are applied depending on whether the subject grid point is (i) a corner grid point that is positioned at a corner of the cube-shaped grid, (ii) an edge grid point that is positioned on an edge but not positioned at the corners, (iii) a surface grid point that is positioned on a surface but neither positioned at the corners nor on the edges, (iv) a gray-axis grid point that is positioned on a gray axis in which R=G=B but not positioned at the corners, or (v) an internal grid point that is positioned inside the cube but not positioned on the gray axis.

Figure 9A:
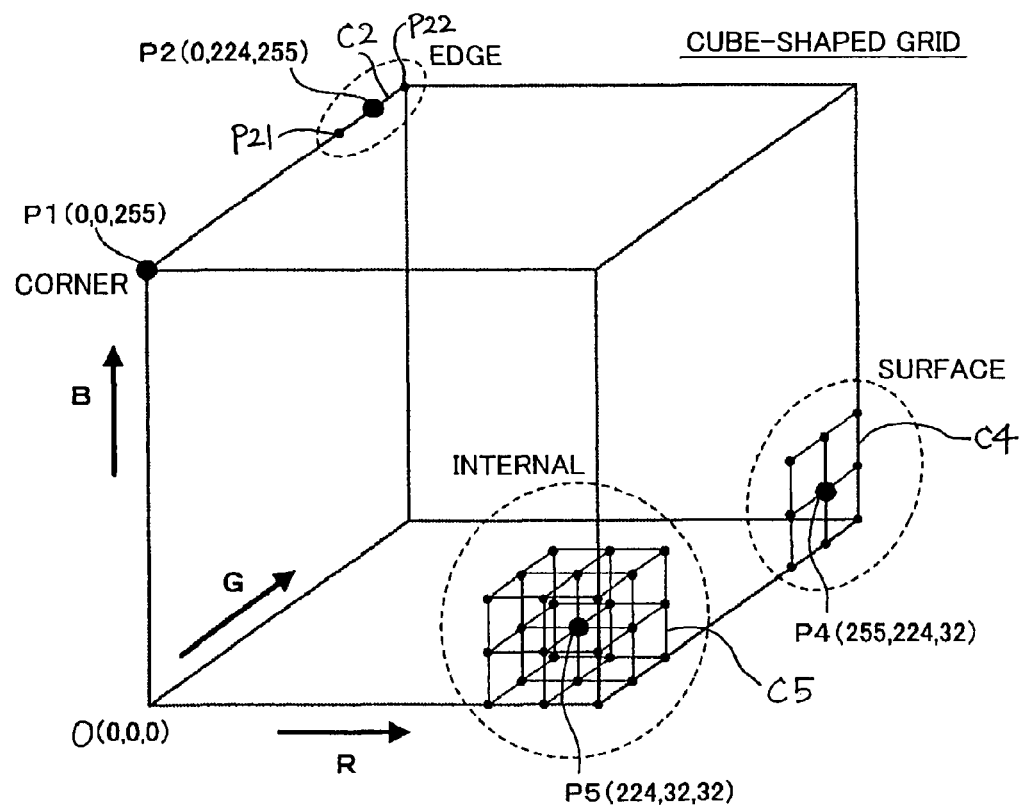
FIG. 9(a) is an explanatory diagram showing a correction range, a correction rectangle, and a correction rectangular parallelepiped that are used in average value calculations in the colorimetric-data correction process.

As shown in FIG. 9(a), when the target grid point is positioned at one of the corners of the cube-shaped grid, such as grid point P1, the CPU 11 sets calorimetric data obtained by the calorimeter as corrected calorimetric data. In other words, the calorimetric data is used without correction.

When the target grid point is positioned on one of the edges but not positioned at the corners of the cube-shaped grid, such as grid point P2, the CPU 11 sets a correction range C2 on the edge that includes the target grid point P2 at a center of the correction range C2, calculates an average value of the calorimetric data corresponding to the target grid point P2 and the calorimetric data corresponding to the adjacent grid points P21 and P22 positioned within the correction range C2, and sets the average value as corrected calorimetric data. In this case, the CPU 11 calculates the average value of the calorimetric data for a total of three grid points including the target grid point P2 and the two adjacent grid points P21 and P22.

When the target grid point is positioned on one of the surfaces of the cube-shaped grid but neither positioned at the corners nor on the edges of the cube-shaped grid, such as grid point P4, the CPU 11 sets a correction rectangle C4 in the surface that includes the target grid point P4 at a center of mass of the correction rectangle C4, calculates an average value of the calorimetric data corresponding to the target grid point P4 and the calorimetric data corresponding to the adjacent grid points included in the correction rectangle C4, and sets the average value as corrected calorimetric data. In the present embodiment, the correction rectangle C4 has a square shape having a side length that is two times the regular interval, allowing the correction rectangle C4 to include eight adjacent grid points. Thus, the CPU 11 calculates the average value of the calorimetric data for a total of nine grid points including the target grid point P4 and the eight adjacent grid points.

Figure 9B:
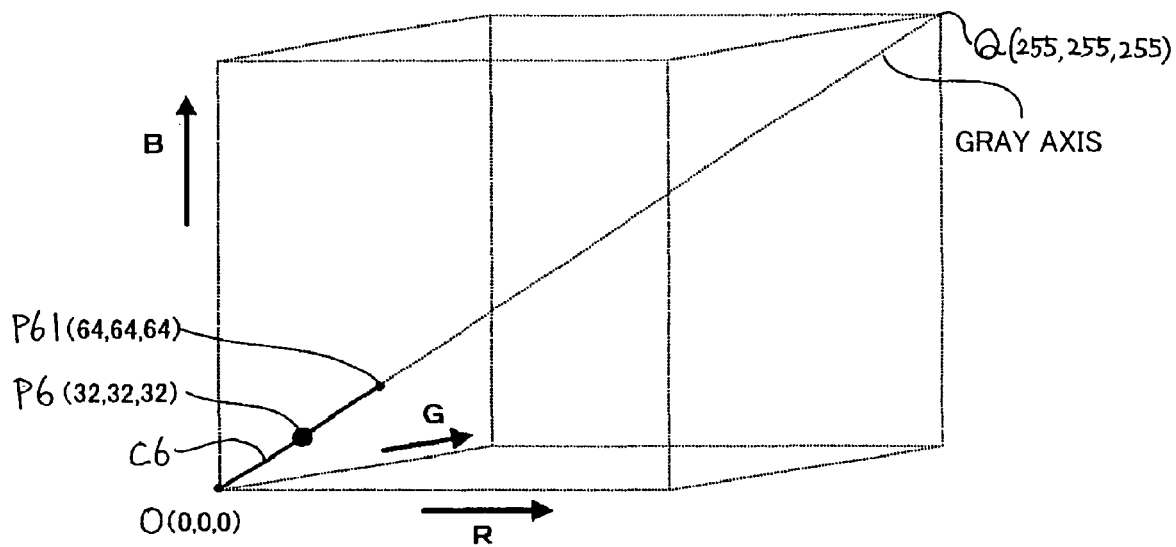
FIG. 9(b) is an explanatory diagram showing a gray axis in the RGB color space and a correction range that is used in an average value calculation for gray-axis calorimetric data in the colorimetric-data correction process.

As shown in FIG. 9(b), when the target grid point is positioned on the gray axis but not positioned at the corners of the cube-shaped grid, such as grid point P6, the CPU 11 sets a correction range C6 on the gray axis that includes the target grid point P6 at a center of the correction range C6, calculates an average value of the colorimetric data corresponding to the target grid point P6 and the calorimetric data corresponding to the adjacent grid points O and P61 positioned within the correction range C6, and sets the average value as corrected calorimetric data. In this case, the CPU 11 calculates the average value of the calorimetric data for a total of three grid points including the target grid point P6 and the two adjacent grid points O and P61.

As shown in FIG. 9(a), when the target grid point is positioned inside the cube-shaped grid and positioned neither on the gray axis, at the corners, on the edges, nor on the surfaces of the cube-shaped grid, such as grid point P5, the CPU 11 sets a correction rectangular parallelepiped C5 that includes the target grid point P5 at a center of mass of the correction rectangular parallelepiped C5, calculates an average value of the calorimetric data corresponding to the target grid point P5 and the calorimetric data corresponding to the adjacent grid points included in the correction rectangular parallelepiped C5, and sets the average value as corrected calorimetric data. In the present embodiment, the correction rectangular parallelepiped C5 has a cube shape having a side length that is two times the regular interval. Thus, the correction rectangular parallelepiped C5 includes 26 adjacent grid points that are positioned adjacent to the target grid point P5 three-dimensionally. In this case, the CPU 11 calculates the average value of the calorimetric data for a total of 27 grid points including the target grid point P5 and the 26 adjacent grid points.

Figure 8:
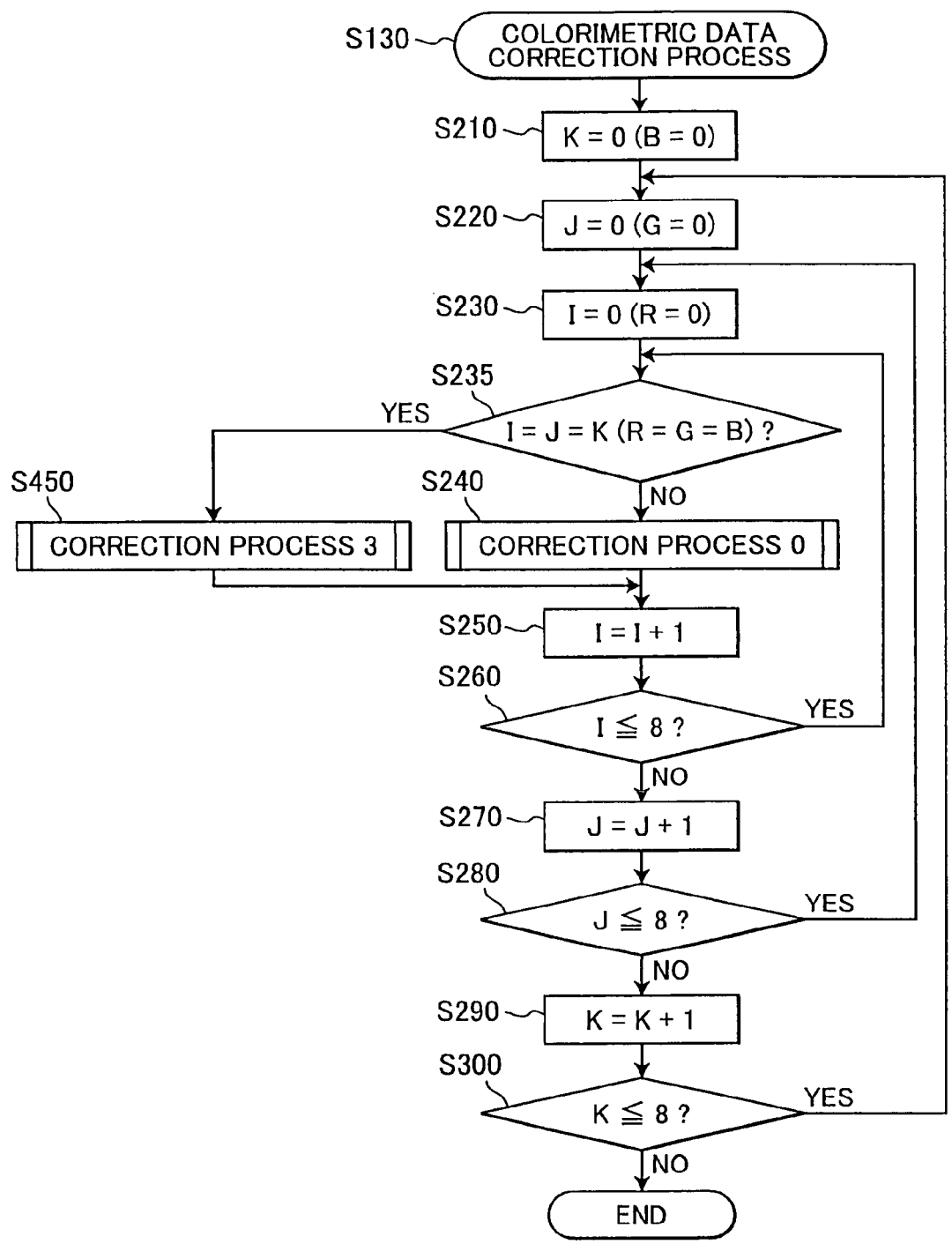
FIG. 8 is a flowchart showing the steps in a colorimetric-data correction process in the LUT creation process of FIG. 5.

The colorimetric-data correction process of S130 is executed based on the above criteria according to the steps shown in FIG. 8. At the beginning of this process, the CPU 11 sets variables K, J, and I to 0 in S210 through S230. In other words, the CPU 11 sets the target grid point to (R, G, B)=(0, 0, 0). Here, variable I corresponds to the R value, J to the G value, and K to the B value in the RGB color space. Each value of I corresponds to the R value for a grid point on the R axis, such that R=0 when I=0, R=32 when I=1, R=64 when I=2, . . . , and R=255 when I=8. Similarly, the values for J and K of 0, 1, 2, . . . , and 8 correspond to the values for G and B of 0, 32, 64, . . . , and 255.

After initializing the variables I, J, and K to 0, the CPU 11 advances to S235. In S235, the CPU 11 determines whether the variables I, J, and K satisfy an equation I=J=K (R=G=B). In other words, the CPU 11 determines whether the target grid point is positioned on the gray axis (FIG. 9(b)). If the equation I=J=K (R=G=B) is not satisfied (S235: NO), the CPU 11 advances to S240 and performs correction process 0. If the equation I=J=K (R=G=B) is satisfied (S235: YES), the CPU 11 advances to S450 and performs correction process 3.

Correction process 0 is described in detail with reference to a flowchart of FIG. 10. In S310, the CPU 11 initializes a variable n to 0. In S320, the CPU 11 determines whether the variable I (R value) is 0 or 8. If the variable I (R value) is 0 or 8 (S320: YES), then the CPU 11 increments n by 1 in S330. However, if the variable I (R value) is neither 0 nor 8 (S320: NO), then the CPU 11 advances directly to S340. The same process is repeated for the variable J (G value) and variable K (B value) in S340 through S370.

In S380, the CPU 11 determines whether the value satisfies n=0. The value n will equal 0 if the target grid point is positioned inside the cube-shaped grid, such as grid point P5 in FIG. 9(a). If n=0 (S380: YES), then the CPU 11 advances to S390 and calculates an average value according to equation (1).

$$Dijk = \left( \sum_{x=i-1}^{i+1} \sum_{y=j-1}^{j+1} \sum_{z=k-1}^{k+1} Sxyz \right) / 27 \quad (1)$$

Here, Sijk indicates raw measurement values for calorimetric data corresponding to the target grid point, while Dijk indicates corrected calorimetric data. Further, variables i, j, and k correspond to the aforementioned variables I, J, and K, respectively.

If the target grid point is positioned on one of the surfaces of the cube-shaped grid, then the value n should be 1. If the value n is 1 (S400: YES), then the CPU 11 performs correction process 2 in S410. Further, if the target grid point is positioned on one of the edges, then the value n should be 2. If the value n is 2 (S420: YES), then the CPU 11 executes correction process 1 in S430. If the target grid point is positioned at one of the corners, then the value n should be 3. In this case, the CPU 11 advances to S440 and sets the calorimetric data obtained by the calorimeter 31 as the corrected calorimetric data (Dijk=Sijk).

Correction process 1 will be described in detail with reference to FIG. 11. FIG. 11 shows steps in correction process 1 (S430 in FIG. 10) when the target grid point is located on one of the edges of the cube-shaped grid, such as grid point P2 in FIG. 9(*a*). If the target grid point is positioned on an edge that is parallel to the B axis, then the variables I and J should both be either 0 or 8 (S610: YES and S630: YES). In this case, in S650 the CPU 11 performs an average value calculation according to equation (2).

$$Dijk = \left(\sum_{z=k-1}^{k+1} Sijz\right)/3 \tag{2}$$

If the target grid point is positioned on an edge that is parallel to the G axis, then the variable I should be either 0 or 8 (S610: YES), but the variable J should be neither 0 nor 8 (S630: NO). In this case, in S640 the CPU 11 performs an average value calculation according to equation (3).

$$Dijk = \left(\sum_{y=j-1}^{j+1} Siyk\right)/3 \tag{3}$$

Further, if the target grid point is positioned on an edge that is parallel to the R axis, then the variable I should be neither 0 nor 8 (S610: NO). In this case, in S620 the CPU 11 performs an average value calculation according to equation (4).

$$Dijk = \left(\sum_{x=i-1}^{i+1} Sxjk\right)/3 \tag{4}$$

Figure 10:
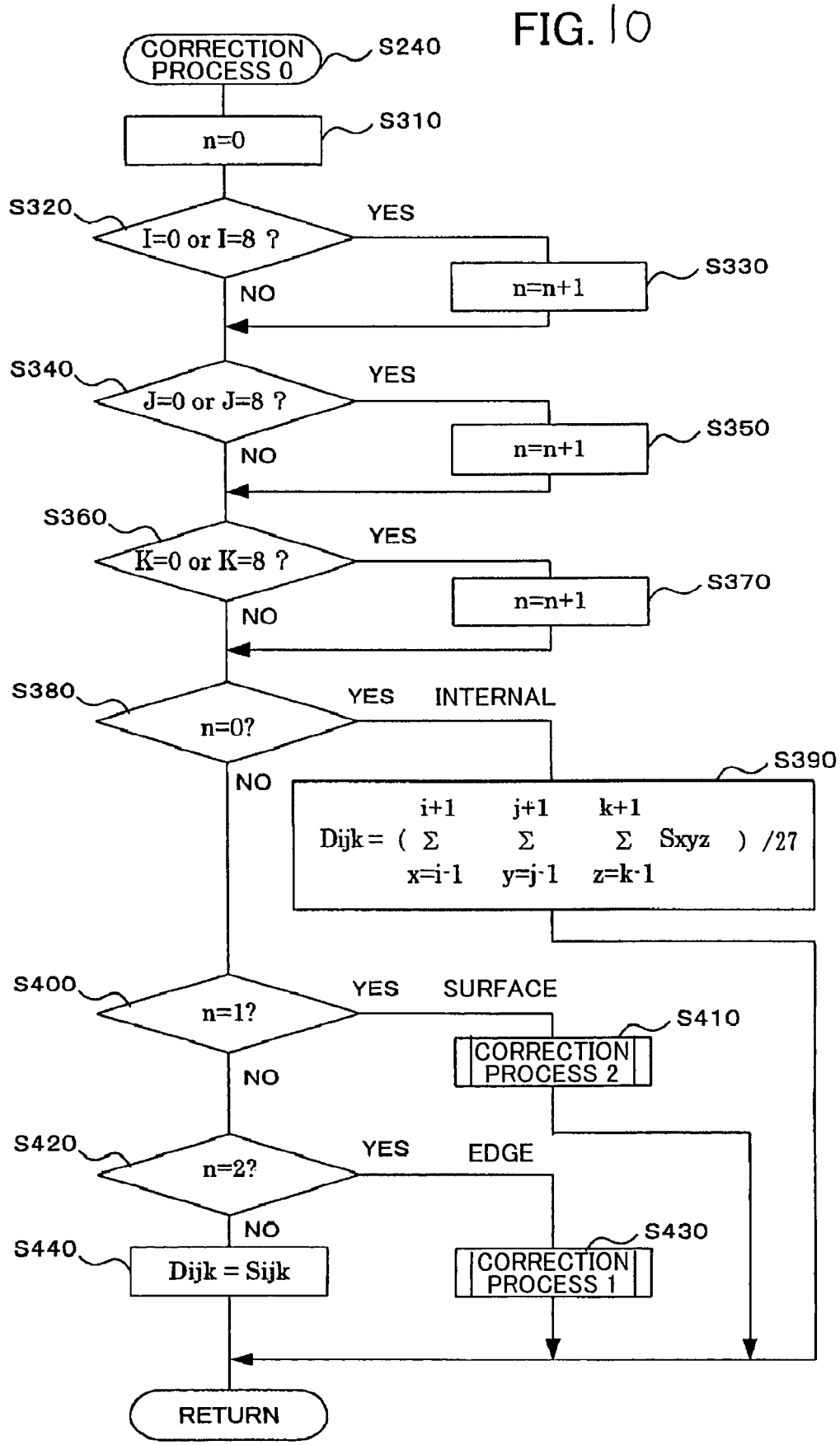
FIG. 10 is a flowchart showing the steps in a correction process 0 in the colorimetric-data correction process of FIG. 8.
Figure 11:
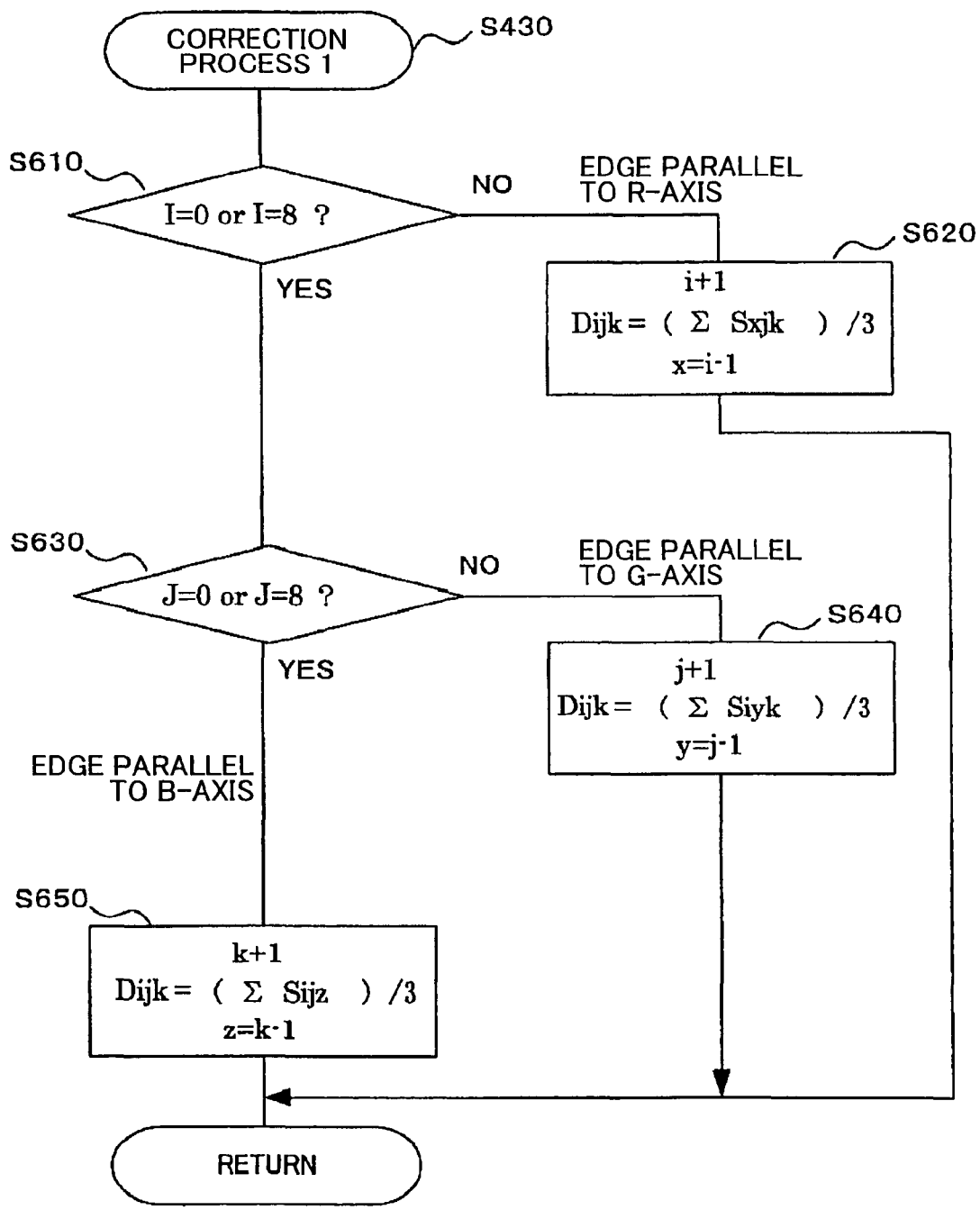
FIG. 11 is a flowchart showing the steps in a correction process 1 in the correction process 0 of FIG. 10.

As described above, after performing an average value calculation in one of S620, S640, and S650 in correction process 1, the CPU 11 returns to S430 in FIG. 10 and further returns to S240 in FIG. 8.

Figure 12:
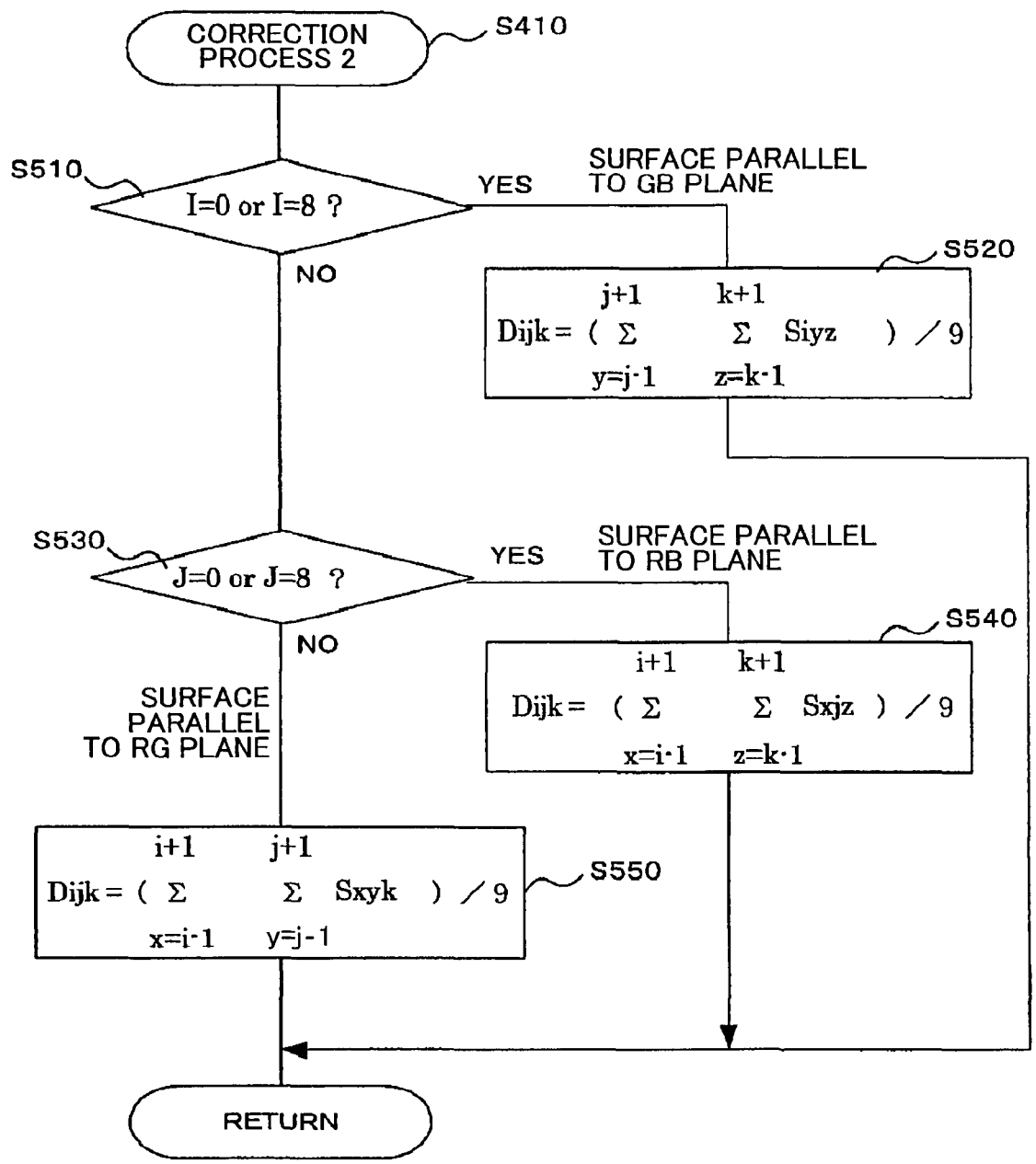
FIG. 12 is a flowchart showing the steps in a correction process 2 in the correction process 0 of FIG. 10.

Correction process 2 will be described in detail with reference to FIG. 12. FIG. 12 shows steps in correction process 2 (S410 in FIG. 10) when the target grid point is located on one of the surfaces of the cube-shaped grid, such as grid point P4 in FIG. 9(*a*). If the target grid point is positioned on a surface that is parallel to the GB plane, then the variable I should be either 0 or 8 (S510: YES). In this case, in S520 the CPU 11 performs an average value calculation according to equation (5).

$$Dijk = \left(\sum_{y=j-1}^{j+1}\sum_{z=k-1}^{k+1} Siyz\right)/9 \tag{5}$$

If the target grid point is positioned on a surface that is parallel to the RB plane, then the variable I should be neither 0 nor 8 (S510: NO), but the variable J should be either 0 or 8 (S530: YES). In this case, in S540 the CPU 11 performs an average value calculation according to equation (6).

$$Dijk = \left(\sum_{x=i-1}^{i+1}\sum_{z=k-1}^{k+1} Sxjz\right)/9 \tag{6}$$

Further, if the target grid point is positioned on a surface that is parallel to the RG plane, then the variable I should be neither 0 nor 8 (S510: NO) and the variable J should also be neither 0 nor 8 (S530: NO). In this case, in S550 the CPU 11 performs an average value calculation according to equation (7).

$$Dijk = \left(\sum_{x=i-1}^{i+1}\sum_{y=j-1}^{j+1} Sxyk\right)/9 \tag{7}$$

As described above, after performing an average value calculation in one of S520, S540, and S550 in correction process 2, the CPU 11 returns to S410 in FIG. 10 and further returns to S240 in FIG. 8.

As shown in FIG. 8, if the equation I=J=K (R=G=B) is satisfied (S235: YES), in S450 the CPU 11 performs correction process 3. Correction process 3 is performed when the target grid point is positioned on the gray axis, such as grid point P6 in FIG. 9(*b*).

Correction process 3 will be described in detail with reference to FIG. 13. In S710, the CPU 11 determines whether the variable I is either 0 or 8. If the variable I is either 0 or 8 (S710: YES), in S720 the CPU 11 sets the calorimetric data obtained by the calorimeter 31 as the corrected calorimetric data (Dijk=Sijk). In this case, because the target grid point is positioned at a corner shown as either O(0, 0, 0) or Q(255, 255, 255) in FIG. 9(*b*), the CPU 11 performs the same process as S440 in FIG. 10.

If the variable I is neither 0 nor 8 (S710: NO), in S730 the CPU 11 performs an average value calculation according to equation (8).

$$Dijk=(S(i-1)(j-1)(k-1)+Sijk+S(i+1)(j+1)(k+1))/3 \tag{8}$$

In this case, because the target grid point is positioned on the gray axis but not positioned at the corners, the CPU 11 calculates the average value of a total of three calorimetric data corresponding to the target grid point and two adjacent grid points positioned on the gray axis. After performing correction process 3, the CPU 11 returns to S450 in FIG. 8.

As shown in FIG. 8, after performing either correction process 0 or correction process 3, the CPU 11 advances to S250 and increments the variable I by 1. In other words, the CPU 11 set the target grid point to a new grid point having an R value that is greater by 32 than the R value of the previous grid point. In S260, the CPU 11 determines whether the variable I is less than or equal to 8. If the variable I is less than or equal to 8 (S260: YES), the CPU 11 goes back to S235 and repeats either correction process 0 in S240 or correction process 3 in S450. The CPU 11 repeats this process (S235, S240 or S450, and S250) on new target grid points until the variable I is incremented to 9. When the variable I reaches 9 (S260: NO), in S270 the CPU 11 increments the variable J by 1. In other words, the CPU 11 shifts the G value of the target grid point. When the variable J is less than or equal to 8 (S280: YES), the CPU 11 returns to S230. Then, the CPU 11 repeats the process from S235 through S260 by incrementing the variable I from 0 through 8 for the incremented variable J. When the variable J reaches 9 (S280: NO), then in S290 the CPU 11 increments the variable K. In other words, the CPU 11 shifts the B value of the target grid point. When the variable K is less than or equal to 8 (S300: YES), the CPU 11 returns to S220. Then, the CPU 11 repeats the process from S230 through S280 by incrementing the variable J from 0 through 8 for the incremented variable K. By continuing the process in this way, the CPU 11 calculates corrected values for all of the 729 grid points.

Figure 14A:
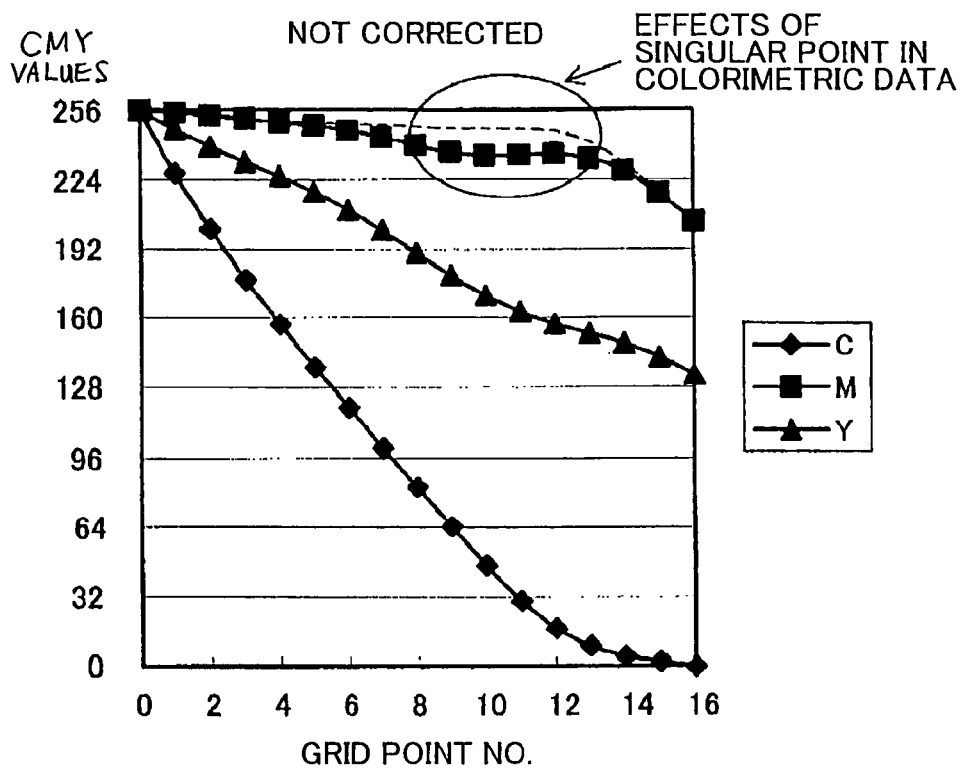
FIG. 14(a) is a graph showing CMY values for grid points in the RGB color space for which RGB-to-CMY conversion has been performed by using an LUT created from uncorrected calorimetric data.
Figure 14B:
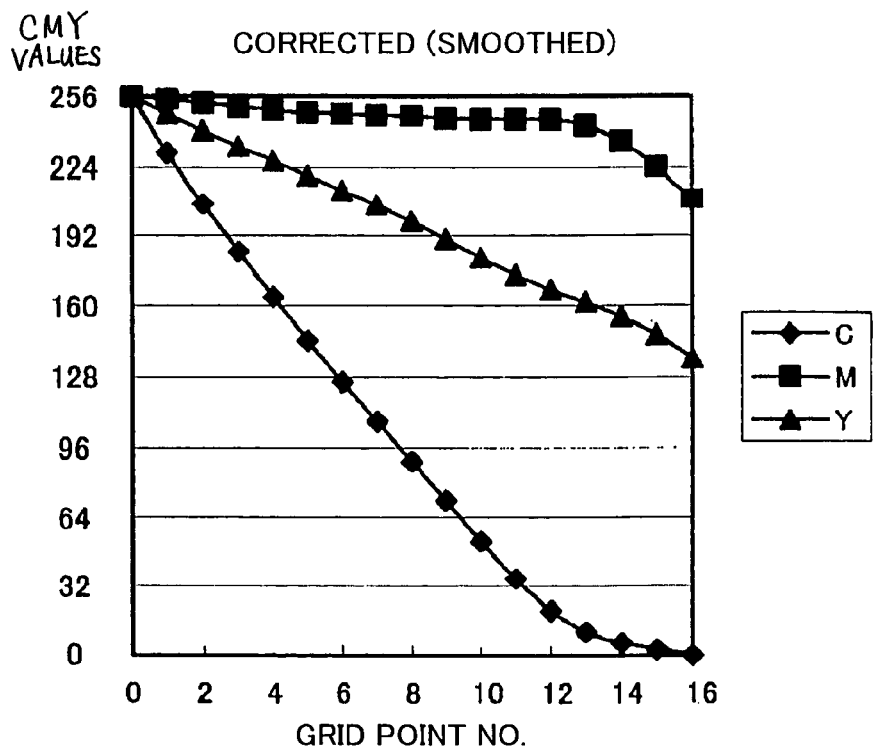
FIG. 14(b) is a graph showing CMY values for grid points in the RGB color space for which RGB-to-CMY conversion has been performed by using an LUT created from calorimetric data corrected by the colorimetric-data correction method according to the embodiment.

According to the colorimetric-data correction method and the conversion-table creating method as described above, it is possible to create the LUT that can perform RGB-to-CMY conversion without irregularities or variations. Accordingly, the printer 20 can generate printing results with correct gradations. FIGS. 14(a) and 14(b) show differences between a case in which no correction on calorimetric data has been performed (FIG. 14(a)) and another case in which correction has been performed according to the colorimetric-data correction method of the present embodiment (FIG. 14(b)).

FIG. 14(a) shows CMY values for grid points in the RGB color space for which RGB-to-CMY conversion has been performed by using an LUT that is created from uncorrected calorimetric data. As shown in FIG. 14(a), the M value is expected to change as indicated by the dotted line in response to changes in the RGB grid point number. However, a singular point or irregular point is generated at grid point No. 10 due to irregularities in the calorimetric data, causing the color characteristics to sink around grid point No. 10. In contrast, FIG. 14(b) shows CMY values for grid points in the RGB color space for which RGB-to-CMY conversion has been performed by using the LUT that is created from the calorimetric data corrected by the colorimetric-data correction method. In FIG. 14(b), the M value changes smoothly as expected without any irregular point.

In the colorimetric-data correcting method described above, the relationship between coordinate points in the color space of the printer 20 and the calorimetric data obtained by the colorimeter 31 is known in advance. Thus, correction of the calorimetric data can be performed based on this relationship. Accordingly, irregularities in the calorimetric data can be suppressed and reliable data can be obtained. A precise color conversion table (the LUT 41) can be created using the corrected calorimetric data. Such a color conversion table helps produce printing results with excellent color tone.

In the colorimetric-data correcting method and the conversion-table creating method described above, correction can be performed according to a simple method that involves only averaging calorimetric data for grid points in the correction range, the correction rectangle, or the correction rectangular parallelepiped, which includes the target grid point in the center.

Further, in the above-described embodiment, averaging calculations are performed by using small numbers of the grid points. For example, the averaging calculations are performed based on the correction ranges C2 and C6 including 3 grid points, the correction rectangle C4 including 9 grid points, or the correction rectangular parallelepiped C5 including 27 grid points. Accordingly, the averaging calculation can be simplified while achieving sufficient correction accuracy.

For grid points on the gray axis, such as grid point P6, correction is performed using only points on the gray axis, thereby achieving a smooth gradation of gray and reducing the chance of hue deviation.

In the above-described embodiment, RGB color space is used for an input color space that represents the input color signals, and Lab color space is used for representing the calorimetric data. This is particularly effective since the RGB and Lab color spaces are most commonly used.

While the invention has been described in detail with reference to the specific embodiment thereof, it would be apparent to those skilled in the art that various changes and modifications may be made therein without departing from the spirit of the invention.

Figure 13:
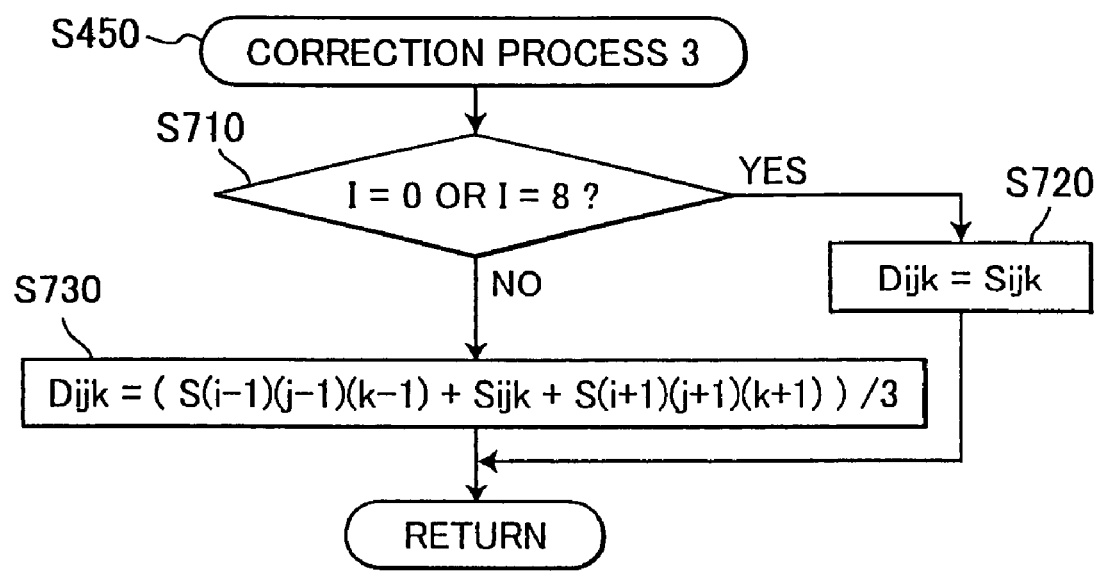
FIG. 13 is a flowchart showing the steps in a correction process 3 in the colorimetric-data correction process of FIG. 8.

For example, in the above-described embodiment, the average value calculation is performed on the calorimetric data corresponding to the gray axis (gray-axis calorimetric data) in S730 of FIG. 13. However, a different method for correcting the gray-axis calorimetric data can be performed as shown in FIGS. 15(a) and 15(b).

Figure 15A:
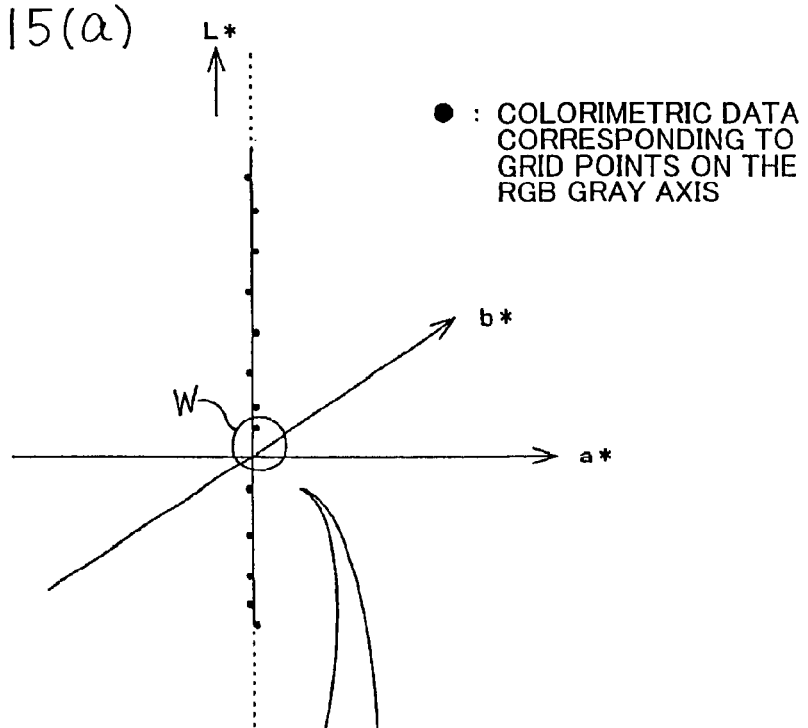
FIG. 15(a) is an explanatory diagram showing a modification in which gray-axis calorimetric data is corrected.
Figure 15B:
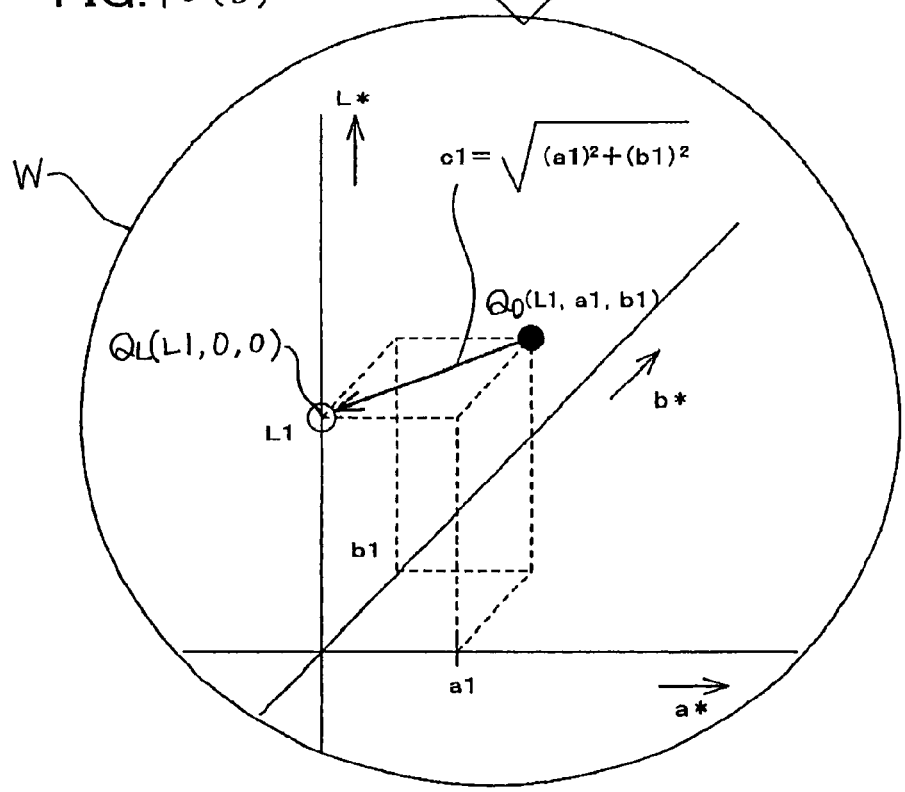
FIG. 15(b) is an enlarged explanatory view showing an area W that is surrounded by a circle in FIG. 15(a)

As shown FIG. 15(a), the Lab color space is defined by L*, a*, and b* axes. The L* axis in the Lab color space corresponds to the gray axis in the RGB color space shown in FIG. 9(b). In FIG. 15(a), dot marks located adjacent to the L* axis indicate calorimetric data corresponding to the grid points on the RGB gray axis, such as the grid points P6 and P61 in FIG. 9(b). FIG. 15(b) is an enlarged explanatory view showing an area W that is surrounded by a circle in FIG. 15(a). A coordinate point $Q_0(L1, a1, b1)$ indicates calorimetric data corresponding to one of the grid points that are located on the RGB gray axis. A distance c1 between the coordinate point $Q_0$ and the L* axis is represented by equation $c1=\sqrt{(a1)^2+(b1)^2}$. In this modification, instead of performing an average value calculation, the CPU 11 shifts the calorimetric data indicated by the coordinate point $Q_0(L1, a1, b1)$ onto the L* axis, without changing a lightness component (L* axis component). More specifically, the coordinate point $Q_0(L1, a1, b1)$ is shifted to a coordinate point $Q_L(L1, 0, 0)$, with maintaining the lightness component L1. Then, the CPU 11 sets the calorimetric data represented by the shifted coordinate point $Q_L(L1, 0, 0)$ as corrected gray-axis calorimetric data.

According to the method in this modification, it is possible to create a color conversion table that is capable of producing accurate gray-color print results from gray input, thereby reproducing gray as the user would expect.

Figure 16A:
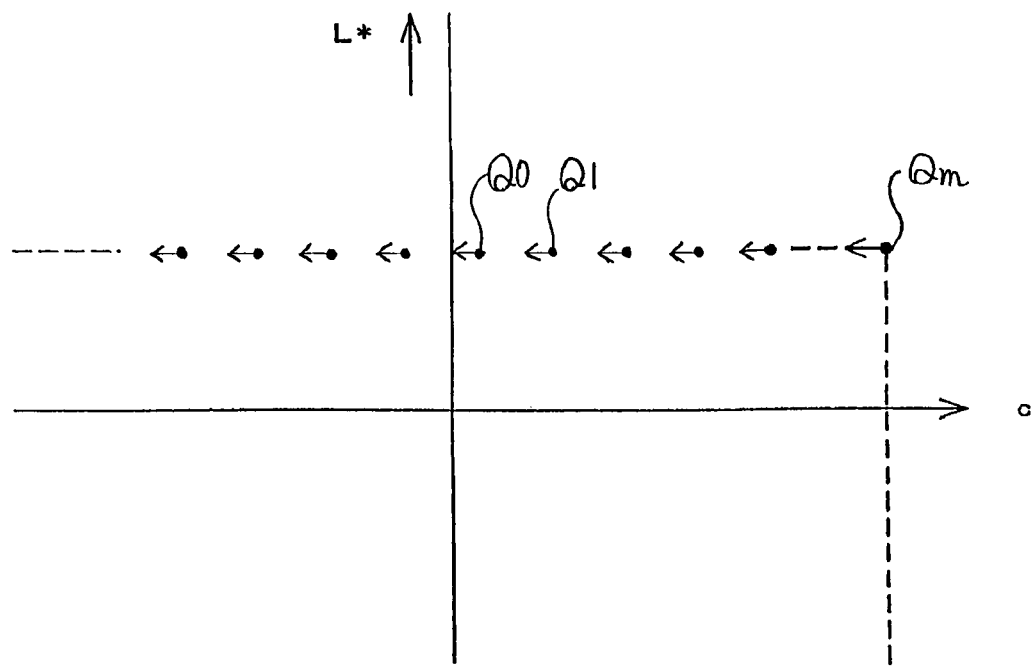
FIG. 16(a) is an explanatory diagram showing another modification in which equi-lightness non-gray-axis calorimetric data are shifted in the same direction and by the same shift amount as the gray-axis calorimetric data.
Figure 16B:
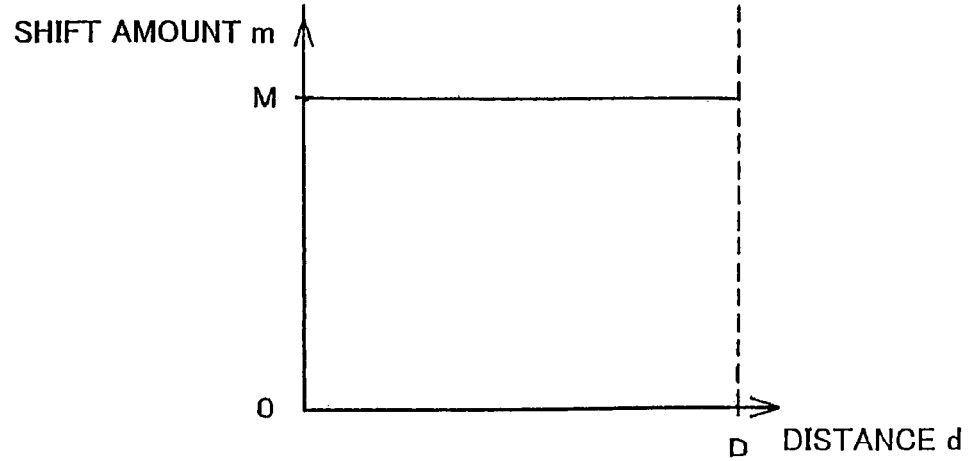
FIG. 16(b) is a graph showing shift amounts of colorimetric data with regard to distances from the gray axis.
Figure 16C:
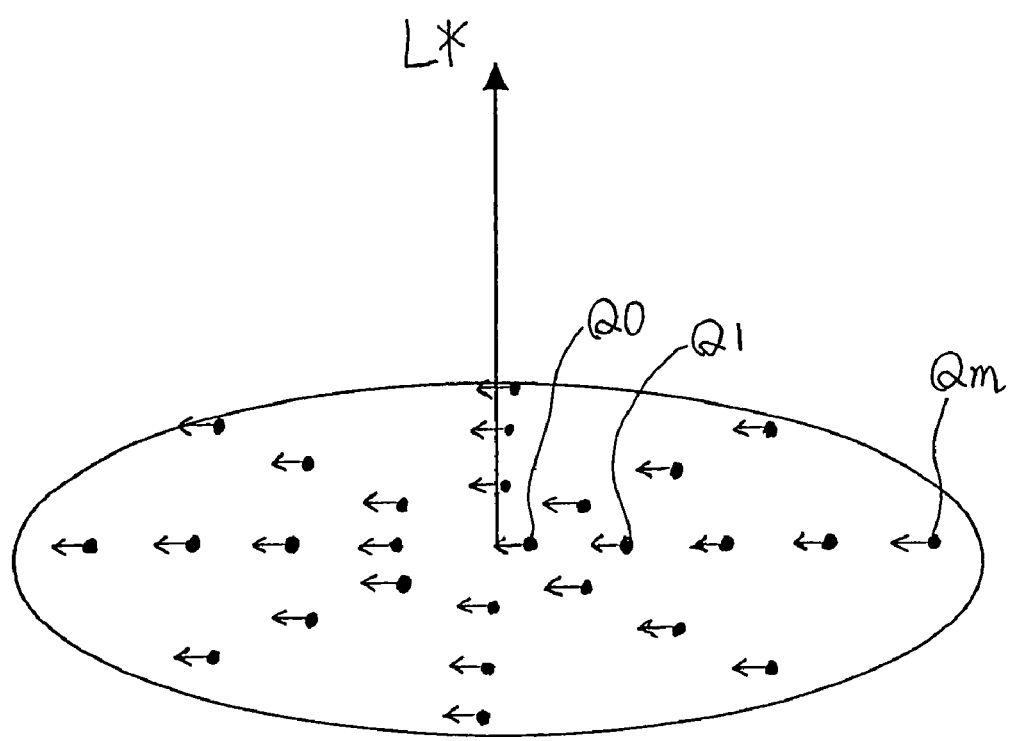
FIG. 16(c) is an explanatory diagram showing three-dimensionally the modification that is shown in FIG. 16(a)

In another modification, as shown in FIGS. 16(a) through 16(c), in addition to calorimetric data corresponding to the gray axis (gray-axis calorimetric data), other calorimetric data having the same lightness as the gray-axis calorimetric data (equi-lightness non-gray-axis calorimetric data) are also shifted in the same direction as the gray-axis calorimetric data. In the present modification, this processing to shift the equi-lightness non-gray-axis calorimetric data is implemented after the averaging calculation. FIG. 16(c) is a three-dimensional view of FIG. 16(a). More specifically, as shown in FIGS. 16(a) and 16(c), gray-axis calorimetric data Q0 is shifted onto the gray axis L*. Equi-lightness non-gray-axis calorimetric data having the same lightness (having the same L* value) as the gray-axis colorimetric data Q0, such as Q1 and Qm, are also shifted in the same direction as the gray-axis calorimetric data Q0. In this example, as shown in FIG. 16(b), shift amounts m for the equi-lightness non-gray-axis calorimetric data are the same as the shift amount of the gray-axis calorimetric data Q0, regardless of a distance d from the gray axis L*. In this modification, because all calorimetric data including the gray-axis calorimetric data Q0 are shifted in the same direction and by the same shift amount, it is possible to reduce the hue deviation of gray color and to prevent jumps in gradation between gray and near-gray colors.

Figure 17A:
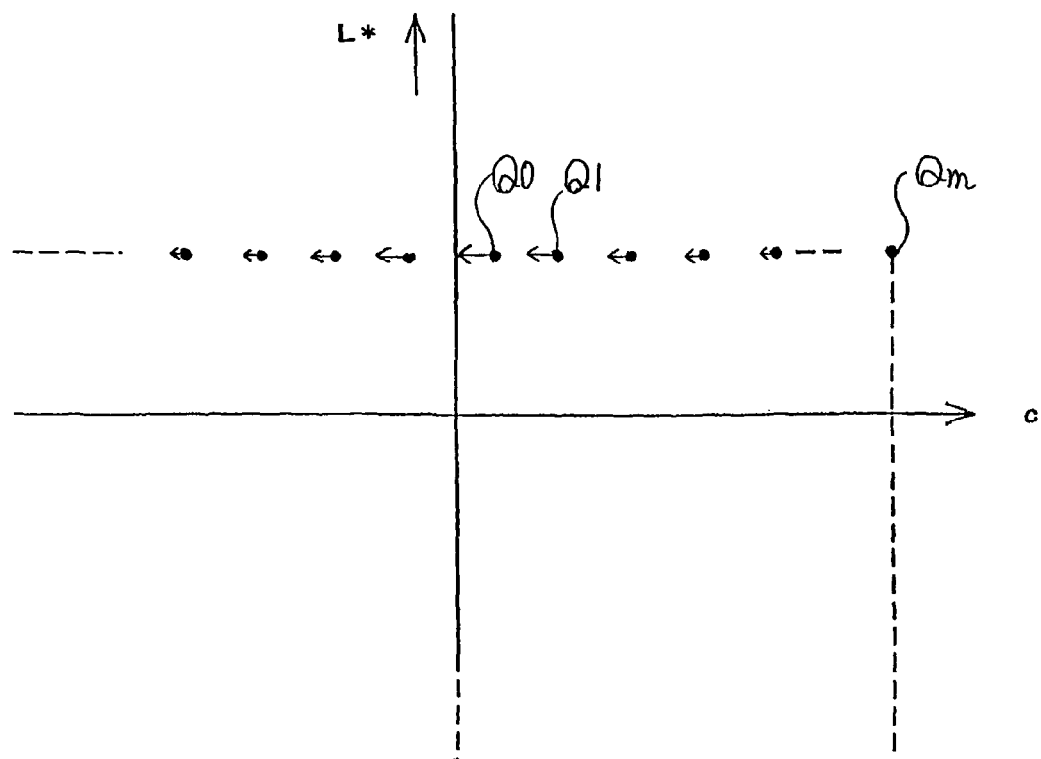
FIG. 17(a) is an explanatory diagram showing another modification in which the equi-lightness non-gray-axis calorimetric data are shifted in the same direction as the gray-axis calorimetric data by the shift amounts that decreases as the distances from the gray axis increases.
Figure 17B:
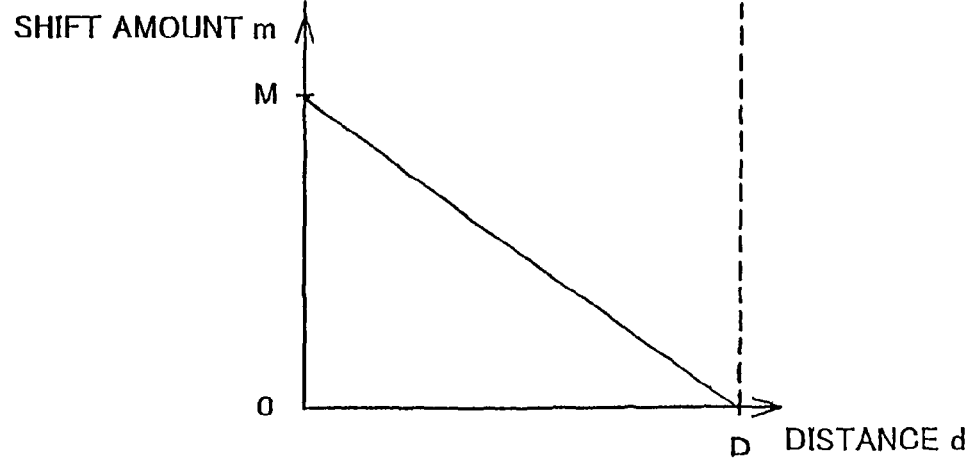
FIG. 17(b) is a graph showing the shift amounts of the calorimetric data with regard to the distances from the gray axis.
Figure 17C:
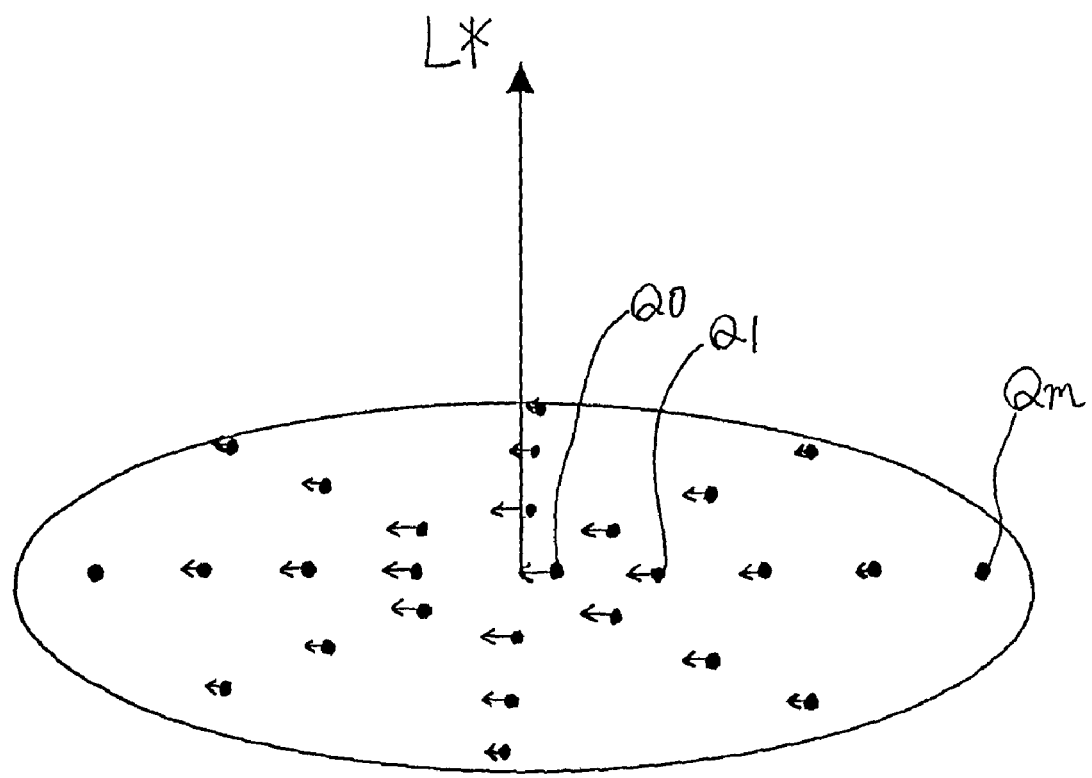
FIG. 17(c) is an explanatory diagram showing three-dimensionally the modification that is shown in FIG. 17(a).

Alternatively, as shown in FIGS. 17(a) through 17(c), the shift amounts m may be reduced as the distance d from the gray axis L* increases. In this example, the calorimetric data farthest from the gray axis L*, such as Qm, is not shifted. Accordingly, it is possible to maintain a color gamut (range of colors that can be reproduced) of the printer 20 and to prevent reproduction of different colors.

In the above-described embodiment, the personal computer 10 stores the application program for implementing the colorimetric-data correcting method and the conversion-table creating method. However, the methods can be implemented in different ways. For example, a separate hardware may be provided for implementing these methods.

In the above-described embodiment, the HDD 14 of the personal computer 10 stores the application program for implementing the colorimetric-data correcting method and the conversion-table creating method. However, the application program for controlling a computer to function as a printing sever or a web server can be stored in a storage medium that can be read by the computer. Such storage medium includes a floppy disk, a magneto-optic disk, a CD-ROM, or a memory card, as well as a hard disk. The application program can be loaded from the storage medium into the computer and executed when necessary.

In the above-described embodiment, the special methods are used for correcting the gray-axis calorimetric data, such as calculating the average value based only on the gray-axis calorimetric data or shifting the gray-axis calorimetric data onto the gray axis. However, it is also possible to correct the gray-axis calorimetric data by applying the same method as non-gray-axis calorimetric data. In this case, S235 and S450 can be omitted from the flowchart of FIG. 8 and correction process 3 in FIG. 13 is not necessary.

In the above-described embodiment, the averaging calculations are performed based on the correction range including three grid points, the correction rectangle including nine grid points, or the correction rectangular parallelepiped including 27 grid points. However, the numbers of grid points included in the correction range, the correction rectangle, and the correction rectangular parallelepiped are not limited to these numbers. Larger or smaller numbers may be used.

Further, although the correction rectangle in the above-described embodiment has a square shape including 9 (3×3) grid points, a rectangle that is not a square (for example, 4×3 grid points) may be used as the correction rectangle. Likewise, although the correction rectangular parallelepiped in the above-described embodiment has a cube shape, a rectangular parallelepiped that is not a cube may be used as the correction rectangular parallelepiped.

The cube-shaped grid in the above-described embodiment is obtained by dividing each axis in the RGB color space into nine grid points equidistant to one another, resulting in 9×9× 9=729 grid points. However, the number of dividing each axis is not limited to nine.

In the above-described embodiment, correction of calorimetric data is performed by calculating average values. However, correction can be performed by the well-known least-square method.

In the above-described embodiment, the RGB color space is used for the input color space and the Lab color space is used for representing the calorimetric data. However, other color spaces can also be used.

Further, the colorimetric-data correcting method and the conversion-table creating method in the above-described embodiment are implemented during production of the printer 20. However, it is also possible that a user implements these methods for adjustments and maintenance of the printer.

What is claimed is:

1. A colorimetric-data correcting method performed by a computer, the method comprising:

printing with a printing device color patches in colors each corresponding to one of a plurality of coordinate points in an output color space defined for the printing device;

measuring each printed color patch with a colorimeter to obtain colorimetric data for each printed color patch, the colorimetric data being represented by coordinate data in a device-independent standard color space;

correcting with a correcting unit the colorimetric data for each of at least one printed color patch by performing a calculation using at least three (3) colorimetric data including the colorimetric data to be corrected; and creating a look-up table based on the corrected colorimetric data, wherein an input color space for an input device is defined three-dimensionally by three coordinate axes;

wherein grid lines are defined in the input color space to form a cube-shaped grid having surfaces, edges, and corners, each grid line extending parallel with one of the three coordinate axes, the grid lines dividing an edge length of the cube shape by an integer N at regular intervals, where the integer N is greater than or equal to two (2);

wherein grid points are defined at each intersecting point of the grid lines, each grid point in the input color space having a one-to-one correspondence with each of the plurality of coordinate points in the output color space for representing each patch; and wherein the step of correcting the colorimetric data includes correcting the colorimetric data obtained for the grid points other than the grid points that are positioned at the corners of the cube-shaped grid.

2. The colorimetric-data correcting method as claimed in claim 1, wherein the step of correcting the colorimetric data includes correcting each colorimetric data by performing a calculation using at least three (3) colorimetric data, the at least three (3) colorimetric data being obtained for a target grid point that corresponds to the colorimetric data to be corrected and at least two (2) adjacent grid points that surround the target grid point.

3. A colorimetric-data correcting method comprising:

printing color patches with a printing device for colors each corresponding to one of a plurality of coordinate points in an output color space defined for the printing device, the printing device being capable of receiving color image signals from an input device and of printing color images;

measuring each color patch with a colorimeter to obtain colorimetric data for each color patch, the colorimetric data being represented by coordinate data in a device-independent standard color space; and correcting the colorimetric data for each of at least one color patch based on at least three (3) colorimetric data including the colorimetric data to be corrected, thereby obtaining a first correlation that specifies relationships between the corrected colorimetric data in the device-independent standard color space and coordinate data in the output color space, in order to create a color-conversion table for storing combination of a plurality of coordinate points in an input color space defined for the input device and a plurality of coordinate points in the output color space, based on both the first correlation and a second correlation, the second correlation specifying predetermined relationships between the corrected colorimetric data in the device-independent standard color space and coordinate data in the input color space, each coordinate point in the input color space corresponding to one color of the color image signals that will possibly be sent from the input device to the printing device.

4. The colorimetric-data correcting method as claimed in claim 3, wherein the input color space is a three-dimensional color space defined by three coordinate axes;
wherein grid lines are defined three-dimensionally in the input color space to form a cube-shaped grid having surfaces, edges, and corners, each grid line extending parallel with one of the three coordinate axes, the grid lines dividing an edge length of the cube shape by an integer N at regular intervals, where the integer N is greater than or equal to two (2);
wherein grid points are defined at each intersecting point of the grid lines, each grid point being specified by coordinate data with respect to the three coordinate axes; and
wherein the step of printing color patches includes:
setting each of the plurality of coordinate points in the output color space with a one-to-one correspondence with each grid point in the input color space; and
printing the color patches for colors each corresponding to each of the plurality of coordinate points in the output color space.

5. The colorimetric-data correcting method as claimed in claim 4, wherein the step of correcting the colorimetric data includes:
selecting each of at least one grid point as a target grid point and selecting several grid points that surrounds the target grid point as adjacent grid points, the target grid point corresponding to the colorimetric data to be corrected, the target grid point and the adjacent grid points being arranged in a shape of a rectangular parallelepiped having surfaces, the target grid point being positioned in a center of mass of the rectangular parallelepiped, allowing a distance from the target grid point to each surface of the rectangular parallelepiped to be an integral multiple of the regular interval of the grid points;
calculating, for each target grid point, an average value for the colorimetric data obtained for the target grid point and the colorimetric data obtained for the adjacent grid points; and
setting the obtained average value as corrected colorimetric data for the target grid point.

6. The colorimetric-data correcting method as claimed in claim 5, wherein the rectangular parallelepiped is a cube defined by a total of twenty-seven (27) grid points that include the target grid point and twenty-six (26) adjacent grid points; and
wherein distances between the target grid point and each surface of the cube are all equal to the regular interval of the grid points.

7. The colorimetric-data correcting method as claimed in claim 4, wherein the step of correcting the colorimetric data includes correcting the colorimetric data by applying different methods depending on a grid position at which a target grid point is located in the cube-shaped grid, the target grid point corresponding to the colorimetric data to be corrected.

8. The colorimetric-data correcting method as claimed in claim 7, wherein the step of correcting the colorimetric data further includes determining the grid position at which the target grid point is located in the cube-shaped grid.

9. The colorimetric-data correcting method as claimed in claim 7, wherein the step of correcting the colorimetric data further includes, when the target grid point is positioned at one of the corners of the cube-shaped grid, setting the colorimetric data obtained by the colorimeter as corrected colorimetric data.

10. The colorimetric-data correcting method as claimed in claim 7, wherein the step of correcting the colorimetric data further includes, when the target grid point is a grid point positioned on one of the edges and is a grid point other than the grid points positioned at the corners of the cube-shaped grid, setting a correction range on the edge that includes the target grid point at a center of the correction range, calculating an average value of the colorimetric data corresponding to the target grid point and the colorimetric data corresponding to the adjacent grid points positioned within the correction range, and setting the average value as corrected colorimetric data.

11. The colorimetric-data correcting method as claimed in claim 10, wherein the step of setting a correction range includes setting the correction range that includes the target grid point and two (2) adjacent gird points; and
wherein the step of calculating an average value includes calculating the average value of the colorimetric data for a total of three (3) grid points including the target grid point and the two (2) adjacent grid points.

12. The colorimetric-data correcting method as claimed in claim 7, wherein the step of correcting the colorimetric data further includes, when the target grid point is positioned on one of the surfaces of the cube-shaped grid but neither positioned at the corners nor on the edges of the cube-shaped grid, setting a correction rectangle in the surface that includes the target grid point at a center of mass of the correction rectangle, calculating an average value of the colorimetric data corresponding to the target grid point and the colorimetric data corresponding to the adjacent grid points included in the correction rectangle, and setting the average value as corrected colorimetric data.

13. The colorimetric-data correcting method as claimed in claim 12, wherein the step of setting a correction rectangle includes setting the correction rectangle in a shape of a square having a side length that is two times the regular interval, allowing the correction rectangle to include eight (8) adjacent grid points; and
wherein the step of calculating an average value includes calculating the average value of the colorimetric data for a total of nine (9) grid points including the target grid point and the eight (8) adjacent grid points.

14. The colorimetric-data correcting method as claimed in claim 7, wherein the input color space has a gray axis on which at least three (3) of the grid points are positioned; and
wherein the step of correcting the colorimetric data further includes, when the target grid point is a grid point positioned on the gray axis and is a grid point other than the grid points positioned at the corners of the cube-shaped grid, setting a correction range on the gray axis that includes the target grid point at a center of the correction range, calculating an average value of the colorimetric data corresponding to the target grid point and the colorimetric data corresponding to the adjacent grid points positioned within the correction range, and setting the average value as corrected colorimetric data.

15. The colorimetric-data correcting method as claimed in claim 14, wherein the step of correcting the colorimetric data further includes, when the target grid point is positioned inside the cube-shaped grid and positioned neither on the gray axis, at the corners, on the edges, nor on the surfaces of the cube-shaped grid, setting a correction rectangular parallelepiped that includes the target grid point at a center of mass of the correction rectangular parallelepiped, calculating an average value of the colorimetric data corresponding to the target grid point and the colorimetric data corresponding to the adjacent grid points included in the correction rectangular parallelepiped, and setting the average value as corrected colorimetric data.

16. The colorimetric-data correcting method as claimed in claim 15, wherein the step of setting a correction rectangular parallelepiped includes setting the correction rectangular parallelepiped in a shape of a cube having a side length that is two times the regular interval, allowing the correction rectangular parallelepiped to include twenty-six (26) adjacent grid points; and wherein the step of calculating an average value includes calculating the average value of the colorimetric data for a total of twenty-seven (27) grid points including the target grid point and the twenty-six (26) adjacent grid points.

17. The colorimetric-data correcting method as claimed in claim 7, wherein the step of correcting the colorimetric data further includes:

when the target grid point is positioned at one of the corners of the cube-shaped grid, setting the colorimetric data obtained by the colorimeter as corrected colorimetric data;

when the target grid point is a grid point positioned on one of the edges and is a grid point other than the grid points positioned at the corners of the cube-shaped grid, setting a correction range on the edge that includes the target grid point at a center of the correction range, calculating an average value of the colorimetric data corresponding to the target grid point and the colorimetric data corresponding to the adjacent grid points positioned within the correction range, and setting the average value as corrected colorimetric data; and when the target grid point is positioned on one of the surfaces of the cube-shaped grid but neither positioned at the corners nor on the edges of the cube-shaped grid, setting a correction rectangle in the surface that includes the target grid point at a center of mass of the correction rectangle, calculating an average value of the colorimetric data corresponding to the target grid point and the colorimetric data corresponding to the adjacent grid points included in the correction rectangle, and setting the average value as corrected colorimetric data.

18. The colorimetric-data correcting method as claimed in claim 17, wherein the input color space has a gray axis on which at least three (3) of the grid points are positioned; and wherein the step of correcting the colorimetric data further includes:

when the target grid point is a grid point positioned on the gray axis and is a grid point other than the grid points positioned at the corners of the cube-shaped grid, setting a correction range on the gray axis that includes the target grid point at a center of the correction range, calculating an average value of the colorimetric data corresponding to the target grid point and the colorimetric data corresponding to the adjacent grid points positioned within the correction range, and setting the average value as corrected colorimetric data; and when the target grid point is positioned inside the cube-shaped grid and positioned neither on the gray axis, at the corners, on the edges, nor on the surfaces of the cube-shaped grid, setting a correction rectangular parallelepiped that includes the target grid point at a center of mass of the correction rectangular parallelepiped, calculating an average value of the colorimetric data corresponding to the target grid point and the colorimetric data corresponding to the adjacent grid points included in the correction rectangular parallelepiped, and setting the average value as corrected colorimetric data.

19. The colorimetric-data correcting method as claimed in claim 4, wherein the input color space has a gray axis on which at least three (3) of the grid points are positioned; and wherein the step of correcting the colorimetric data includes correcting the colorimetric data for a target grid point positioned on the gray axis, based only on the colorimetric data for the target grid point and at least two (2) adjacent grid points positioned on the gray axis.

20. The colorimetric-data correcting method as claimed in claim 19, wherein the step of correcting the colorimetric data includes, when the target grid point is positioned on the gray axis, calculating an average value of the colorimetric data for a total of three (3) grid points including the target grid point and two (2) adjacent grid points positioned on the gray axis and adjacent to the target grid point.

21. The colorimetric-data correcting method as claimed in claim 4, wherein an input-space gray axis is defined in the input color space, and a standard-space gray axis is defined in the device-independent standard color space;

wherein the grid points of the cube-shaped grid includes at least one gray-axis grid point that is positioned on the input-space gray axis and at least one non-gray-axis grid point that is a grid point other than the at least one gray-axis grid point;

wherein the colorimetric data includes at least one gray-axis colorimetric data and at least one non-gray-axis colorimetric data, each gray-axis colorimetric data corresponding to each gray-axis grid point, each non-gray-axis colorimetric data corresponding to each non-gray-axis grid point, each colorimetric data having a lightness component; and wherein the step of correcting the colorimetric data includes:

selecting at least one gray-axis colorimetric data from the colorimetric data;

shifting coordinate data of the at least one gray-axis colorimetric data onto the standard-space gray axis while maintaining the lightness component; and setting colorimetric data represented by the shifted coordinate data as corrected gray-axis colorimetric data.

22. The colorimetric-data correcting method as claimed in claim 21, wherein the step of correcting the colorimetric data further includes:

selecting, from the colorimetric data, at least one equi-lightness non-gray-axis colorimetric data that is non-gray-axis colorimetric data having the lightness component equal to the lightness component of the corresponding gray-axis colorimetric data; and shifting coordinate data of the selected at least one equi-lightness non-gray- axis colorimetric data in a direction in which the coordinate data of the gray-axis colorimetric data is shifted.

23. The colorimetric-data correcting method as claimed in claim 22, wherein the coordinate data of the at least one equi-lightness non-gray-axis colorimetric data is shifted by a shift amount that is equal to a shift amount of the corresponding gray-axis colorimetric data.

24. The colorimetric-data correcting method as claimed in claim 22, wherein the coordinate data of the at least one equi-lightness non-gray-axis colorimetric data is shifted by a shift amount that decreases according as a distance between the coordinate data of each equi-lightness non-gray-axis colorimetric data and the standard-space gray axis increases.

25. The colorimetric-data correcting method as claimed in claim 3, wherein the input color space is an RGB color space, and the device-independent standard color space is an Lab color space.

26. A conversion-table creating method comprising:
printing color patches with a printing device for colors each corresponding to one of a plurality of coordinate points in an output color space defined for the printing device, the printing device being capable of receiving color image signals from an input device and of printing color images;
measuring each color patch with a colorimeter to obtain colorimetric data for each color patch, the colorimetric data being represented by coordinate data in a device-independent standard color space;
correcting the colorimetric data for each of at least one color patch based on at least three (3) colorimetric data including the colorimetric data to be corrected, thereby obtaining a first correlation that specifies relationships between the corrected colorimetric data in the device-independent standard color space and coordinate data in the output color space; and
creating a color-conversion table for storing combination of a plurality of coordinate points in an input color space defined for the input device and a plurality of coordinate points in the output color space, based on both the first correlation and a second correlation, the second correlation specifying predetermined relationships between the corrected colorimetric data in the device-independent standard color space and coordinate data in the input color space, each coordinate point in the input color space corresponding to one color of the color image signals that will possibly be sent from the input device to the printing device.

27. A computer-readable storage medium that stores a colorimetric-data correcting program to be executed by a computer, the program comprising instructions for:
printing with a printing device color patches in colors each corresponding to one of a plurality of coordinate points in an output color space defined for the printing device;
measuring each printed color patch with a colorimeter to obtain colorimetric data for each printed color patch, the colorimetric data being represented by coordinate data in a device-independent standard color space;
correcting the colorimetric data for each of at least one printed color patch by performing a calculation using at least three (3) colorimetric data including the colorimetric data to be corrected; and
creating a look-up table based on the corrected colorimetric data.

28. A computer-readable storage medium that stores a conversion-table creating program to be executed by a computer, the programs comprising instructions for:
printing color patches with a printing device for colors each corresponding to one of a plurality of coordinate points in an output color space defined for the printing device, the printing device being capable of receiving color image signals from an input device and of printing color images;
measuring each color patch with a colorimeter to obtain colorimetric data for each color patch, the colorimetric data being represented by coordinate data in a device-independent standard color space;
correcting the colorimetric data for each of at least one color patch based on at least three (3) colorimetric data including the colorimetric data to be corrected, thereby obtaining a first correlation that specifies relationships between the corrected colorimetric data in the device-independent standard color space and coordinate data in the output color space; and
creating a color-conversion table for storing combination of a plurality of coordinate points in an input color space defined for the input device and a plurality of coordinate points in the output color space, based on both the first correlation and a second correlation, the second correlation specifying predetermined relationships between the corrected colorimetric data in the device-independent standard color space and coordinate data in the input color space, each coordinate point in the input color space corresponding to one color of the color image signals that will possibly be sent from the input device to the printing device.

* * * * *